United States Patent
Gerwens et al.

(10) Patent No.: US 12,182,124 B1
(45) Date of Patent: Dec. 31, 2024

(54) QUERY OPTIMIZER-READABLE OBJECTS FACILITATING DATA SOURCE SWITCHING

(71) Applicant: SAP SE, Walldorf (DE)

(72) Inventors: Heiko Gerwens, Heidelberg (DE); Johannes Merx, Heidelberg (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/211,190

(22) Filed: Jun. 16, 2023

(51) Int. Cl.
*G06F 16/2453* (2019.01)

(52) U.S. Cl.
CPC .. *G06F 16/24544* (2019.01); *G06F 16/24545* (2019.01)

(58) Field of Classification Search
CPC ......... G06F 16/24544; G06F 16/24545; G06F 16/24542
See application file for complete search history.

(56) References Cited

U.S. PATENT DOCUMENTS

| | | | |
|---|---|---|---|
| 6,850,927 B1 * | 2/2005 | Hsu | G06F 16/24542 |
| 10,909,114 B1 * | 2/2021 | Virtuoso | G06F 16/2282 |
| 2008/0177694 A1 * | 7/2008 | Chaudhuri | G06F 16/24542 |

* cited by examiner

*Primary Examiner* — William Spieler
(74) *Attorney, Agent, or Firm* — Klarquist Sparkman, LLP

(57) ABSTRACT

Techniques and solutions are provided for improving query performance of queries that can dynamically switch between accessing different data sources for a particular operation. The disclosure provides an object type, which can be referred to as a configuration object, that specifies which of multiple data sources should be used in query execution at a particular point in time. Values that specify a data source can be included as data in an instance of the object type, such as values in a relational database table that implements the configuration object. A data source to be used with a query can be changed dynamically by updating contents of the table. During query optimization, a query optimizer can recognize that the configuration object is of a particular type that causes the query optimizer to access contents of the configuration object. The contents can be used to prune portions of a query plan.

20 Claims, 17 Drawing Sheets

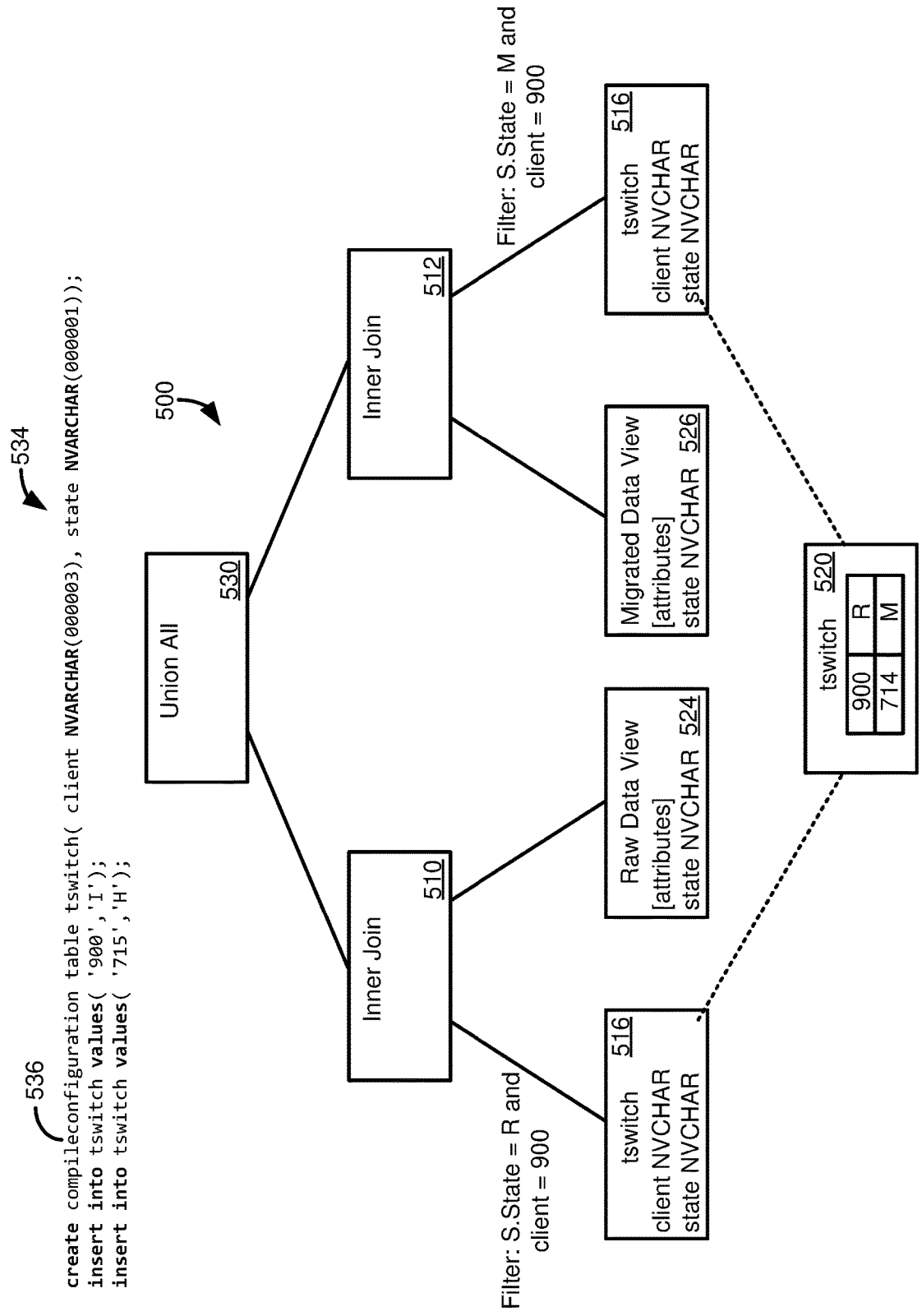

QUERY OPTIMIZER-READABLE OBJECTS FACILITATING DATA SOURCE SWITCHING

FIELD

The present disclosure generally relates retrieving data from a data store. Particular implementations relate to facilitating query optimization when data used in query optimization of a query can be read from a data object of a set of data objects based on a state of data associated with the data object.

BACKGROUND

Many software applications, particularly enterprise level software applications, interact with data in one or more data stores, including data associated with different data objects within a common data store or between data objects of different data stores, where an example of a data store can be a relational database system. Differences between different data objects can arise from a format in which data is stored. Differences between data objects (such as relational database tables or views) within a single data store can also exist, even when the data is stored in a common "format."

Consider first a scenario where data objects are stored within the same database system, where the data objects can be tables or views in a relational database. Different table or view definitions may be more or less suitable for different use scenarios, and so it can be beneficial to have different objects defined for each scenario. As an example, the HANA database of SAP SE, of Walldorf, Germany, can be considered a hybrid OLAP (online analytical processing)/OLTP (online transaction processing) database, or HTAP (hybrid transactional/analytical processing) system, that can perform both OLTP and OLAP types of processing. Even though an HTAP system can perform analytical and transactional processing with the same data objects, in at least some cases it may be useful to have data objects that are more optimized for analytical use cases and other database objects that are more optimized for transactional use cases.

Regarding different formats, it is not uncommon for data to be stored in different formats, including in formats that are used by different software applications. That is, for example, data may be stored by/for use with a first application in an unstructured format (such as unstructured text) or in semi-structured format (such as XML or JSON), but it may be desirable to transform that data to a structured format, such as a relational format.

Transactional data, for instance, is typically stored in row format tables, and a data schema/model may be optimized for performing write or update operations (sometimes referred to as an OLTP format). At least a portion of the transactional data may be converted to a format that facilitates data analysis, such as an OLAP format. Data for use in OLAP applications may be stored in column format tables, rather than row format tables, and may have a data schema/model that facilitates read operations or more complex analysis operations, such as facilitating queries with multiple JOIN operations or complex aggregations.

Format differences can also arise when data is transferred between data stores, which can be of the same type, but where the data has a different format. For example, it may be desirable to migrate data from one system, having a first schema, to another system, having a different schema. Among other things, data can be organized differently in the different schemas, or attributes associated with the data can have different datatypes.

Issues can arise when a single application needs to switch between accessing data in different data objects, whether between multiple computing systems or within a single computing system, during the runtime of the application. For example, a particular database client might wish switch between an HTAP database object that is optimized for transactional processing and an HTAP database object that is optimized for analytical processing during operation of the application. Or, the application may be accessed by different clients, and it may be desirable to have one client use one version of a data object (such as one optimized for transactional processing) and another client use a different version of the data object (such as one optimized for analytical processing).

As another example, consider data associated with a data migration process. The underlying data may be important for the operation of a business. It may be preferable to use migrated data, as the migrated data may be in a format that is more efficient to process, or have undergone processes such as validation or cleansing. However, if particular data, such as data associated with a particular object of a data model or schema, has not completed the migration process, it may be preferable for a software application to have access to the unmigrated (also referred to as "raw") data. Once the data has completed the migration process, it may be beneficial to have the software application use the migrated data instead of the raw data.

Despite the desirability of using different data objects for different clients or use scenarios, it can be difficult to change data objects used by an application, whether between different data sources/formats, or between data objects created for particular purposes, whether because of a change for one particular client, or to facilitate processing differences for different clients. These issues can be particularly challenging when it is desired to switch between data objects dynamically during runtime, and even more so when there are many instances where it may be desirable to dynamically switch between two or more data objects. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are provided for improving query performance of queries that can dynamically switch between accessing different data sources for a particular operation. The disclosure provides an object type, which can be referred to as a configuration object, that specifies which of multiple data sources should be used in query execution at a particular point in time. Values that specify a data source can be included as data in an instance of the object type, such as values in a relational database table that implements the configuration object. A data source to be used with a query can be changed dynamically by updating contents of the table. During query optimization, a query optimizer can recognize that the configuration object is of a particular type that causes the query optimizer to access contents of the configuration object. The contents can be used to prune portions of a query plan.

In one aspect, the present disclosure provides a process of optimizing a query that may access different objects using switching information. A query is received. The query is processed with a query optimizer. Processing the query with the query optimizer includes determining that the query includes a first join operation and a second join operation, where the first join operation references a first object and a second object, and the second join operation references the first object and a third object.

It is determined that the first object is of a first object type. Based on determining that the first object is of a first object type, values stored in the first object for a first attribute type are retrieved. It is determined that the second object includes values for a second attribute type that match at least one value of the first attribute type for the first object, where the first attribute type and the second attribute type correspond to a condition of the first join operation. It is determined that the third object does not comprise values for a third attribute type that match at least one value of the first attribute type for the first object, where the first attribute type and the third attribute type correspond to a condition of the second join operation. The second join operation is pruned from a search space considered by the query optimizer.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIGS. 5A-5D illustrate a disclosed technique for switching between data sources for data using an object of a type that is recognized by a query optimizer and whose data is read as part of query optimization.

DETAILED DESCRIPTION

Example 1—Overview

Figure 1:
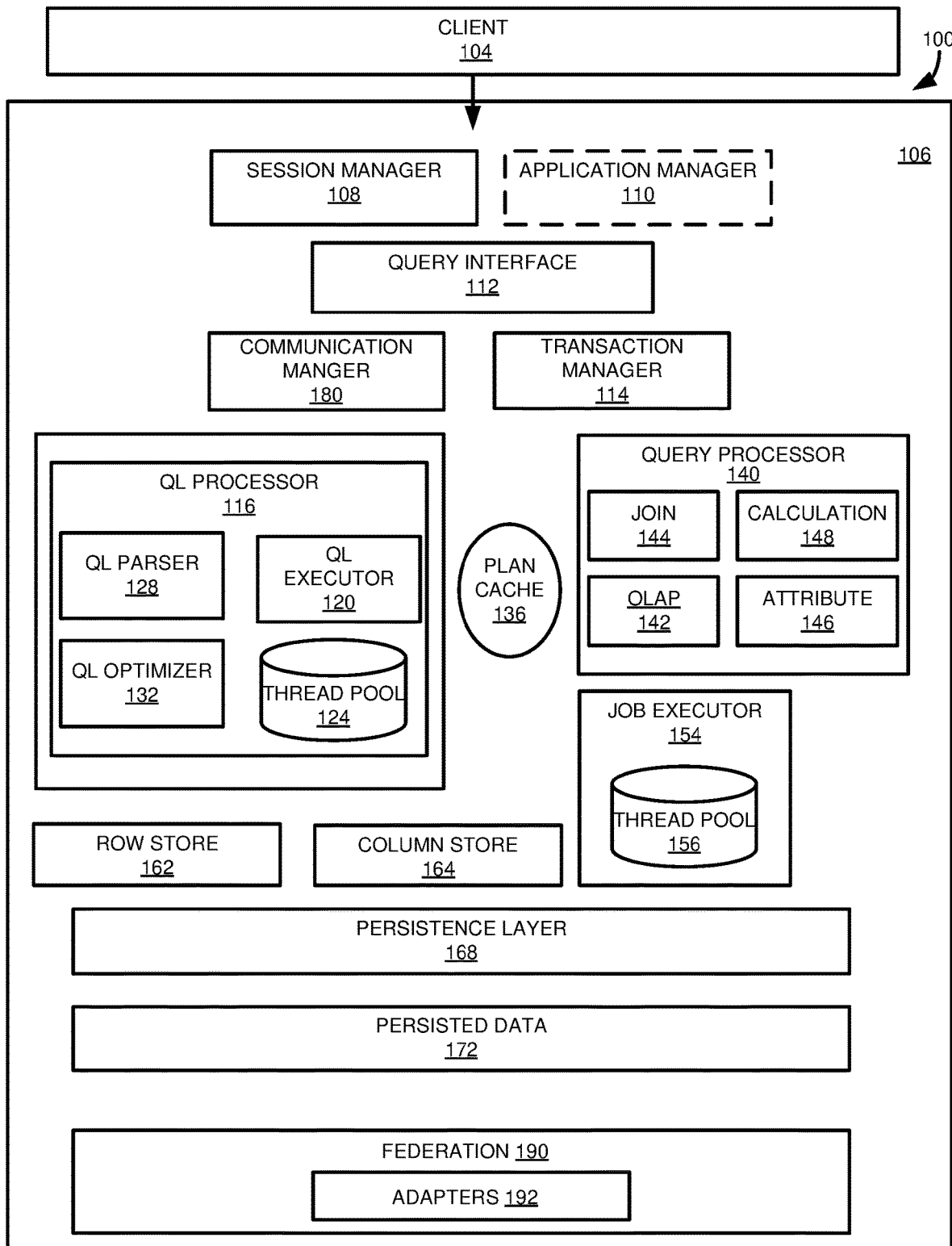
FIG. 1 is a diagram depicting an example database system that can be used in implementing aspects of disclosed technologies.

Many software applications, particularly enterprise level software applications, interact with data in one or more data stores, including data associated with different data objects within a common data store or between data objects of different data stores, where an example of a data store can be a relational database system. Differences between different data objects can arise from a format in which data is stored. Differences between data objects (such as relational database tables or views) within a single data store can also exist, even when the data is stored in a common "format."

Consider first a scenario where data objects are stored within the same database system, where the data objects can be tables or views in a relational database. Different table or view definitions may be more or less suitable for different use scenarios, and so it can be beneficial to have different objects defined for each scenario. As an example, the HANA database of SAP SE, of Walldorf, Germany, can be considered a hybrid OLAP (online analytical processing)/OLTP (online transaction processing) database, or HTAP (hybrid transactional/analytical processing) system, that can perform both OLTP and OLAP types of processing. Even though an HTAP system can perform analytical and transactional processing with the same data objects, in at least some cases it may be useful to have data objects that are more optimized for analytical use cases and other database objects that are more optimized for transactional use cases.

Regarding different formats, it is not uncommon for data to be stored in different formats, including in formats that are used by different software applications. That is, for example, data may be stored by/for use with a first application in an unstructured format (such as unstructured text) or in semi-structured format (such as XML or JSON), but it may be desirable to transform that data to a structured format, such as a relational format.

Transactional data, for instance, is typically stored in row format tables, and a data schema/model may be optimized for performing write or update operations (sometimes referred to as an OLTP format). At least a portion of the transactional data may be converted to a format that facilitates data analysis, such as an OLAP format. Data for use in OLAP applications may be stored in column format tables, rather than row format tables, and may have a data schema/model that facilitates read operations or more complex analysis operations, such as facilitating queries with multiple JOIN operations or complex aggregations.

Format differences can also arise when data is transferred between data stores, which can be of the same type, but where the data has a different format. For example, it may be desirable to migrate data from one system, having a first schema, to another system, having a different schema. Among other things, data can be organized differently in the different schemas, or attributes associated with the data can have different datatypes.

Issues can arise when a single application needs to switch between accessing data in different data objects, whether between multiple computing systems or within a single computing system, during the runtime of the application. For example, a particular database client might wish to switch between an HTAP database object that is optimized for transactional processing and an HTAP database object that is optimized for analytical processing during operation of the application. Or, the application may be accessed by different clients, and it may be desirable to have one client use one version of a data object (such as one optimized for transactional processing) and another client use a different version of the data object (such as one optimized for analytical processing).

As another example, consider data associated with a data migration process. The underlying data may be important for the operation of a business. It may be preferable to use migrated data, as the migrated data may be in a format that is more efficient to process, or have undergone processes such as validation or cleansing. However, if particular data, such as data associated with a particular object of a data model or schema, has not completed the migration process, it may be preferable for a software application to have access to the unmigrated (also referred to as "raw") data. Once the data has completed the migration process, it may be beneficial to have the software application use the migrated data instead of the raw data.

Despite the desirability of using different data objects for different clients or use scenarios, it can be difficult to change data objects used by an application, whether between different data sources/formats, or between data objects created for particular purposes, whether because of a change for one particular client, or to facilitate processing differences for different clients. These issues can be particularly challenging when it is desired to switch between data objects dynamically during runtime, and even more so when there are many instances where it may be desirable to dynamically switch between two or more data objects. Accordingly, room for improvement exists.

Various techniques have been implemented to switch between different data sources for a particular application. The present disclosure generally proceeds using an example data migration scenario, where data is being migrated from a first data source to a second data source. The data from the first data source can be referred to as raw data. The raw data is subject to various processes, such as data analysis and profiling, data mapping and transformation, and data validation and testing, and results in migrated data in a second data source. The first and second data sources can be on a common computing system, or can be on different computing systems. For example, the first data source can be located on a separate computing system in a scenario where data is migrated between an on-premise database and a cloud database system, or when the data is being migrated between database systems of different vendors. In other cases, raw data can be copied to the database system that also stores the migrated data, and thus the raw data and the migrated data are located on the same computing system.

However, it should be appreciated that disclosed techniques can be used in scenarios other than data migration as discussed above. Generally, disclosed techniques can be used in scenarios where two more computing objects, such as objects in a data model or schema, are available for data that is generally equivalent for the purposes of a software application, even if different processes may be needed to retrieve and process the data for the software application, and if some data might be more recent, complete, or reliable than other data. In addition, while the disclosed techniques are generally described as switching between two data sources (such as a source of raw data and a source of migrated data), it should be appreciated that disclosed techniques can be used in scenarios with more than two data sources.

Example 2 describes a general relational database environment in which disclosed techniques can be implemented. Example 3 describes how a software application can access data from a data source using an intermediate software layer, such as a layer that includes a virtual data model that is mapped to one or more physical data models of one or more data sources that hold the relevant data.

Example 4 describes a prior example of a technique for switching between data sources that involves the use of a configuration table. As will be described in more detail, this technique involves the use of a configuration table that stores information about particular data sources that should be used for data retrieval, and where the configuration table can be updated when it is descried to change from one data source to another data source. Drawbacks of this approach include that the contents of the configuration table are not visible to a query optimizer, and data models created using this approach can be very complex.

This approach can suffer from various problems. Because the query optimizer does not "know" what data source will be used during query execution, it cannot "prune" paths that are not relevant given a particular "state" for a given set of data, such as a data associated with an object in a physical database model. Thus, the query optimizer still produces a complex query plan to be evaluated/executed at runtime. Moreover, because of the complexity of the query and underlying objects, including complexity specifically introduced to implement "switching logic" for data sets, the query optimizer may not find an optimized path, since typically a query optimizer is limited in the number of plans it will consider as part of an optimization process.

In addition to the limitations, the query optimization process may be more time and computing resource intensive than if the switching logic was not implemented in the data model, or if some mechanism existed to allow the query optimizer to prune suboptimal query plans (or portions of a plan being generated). Similar issues can arise during query execution, as some branches may be executed even if turns out they are not associated with relevant data (because the branch is associated with a data source that is "turned off" via the switching logic).

Example 5 describes a prior technique developed to address the issues with the technique discussed in Example 4. In this technique, switching information is included in a data model object, rather than in a configuration table. That is, the switching information is part of the definition of a model object, rather than being data stored in an instance of the model object created according to its definition (such as in the case of the configuration table). Because the switching information is included in the model object's definition, it is available to the query optimizer, and so the query optimizer can prune plan branches that are not "active" given current switch settings. However, changing switching information requires updating the relevant switch objects in the model, and recompiling application views that directly or indirectly involve a given switch object. These activities can require substantial work in updating views, as well as computing resources associated with the recompiling. In addition, because the views become more technically complex, and because the switch information is in an object's definition, rather than stored in an instance of the object, users or application processes may lack sufficient privileges to modify switching information.

Disclosed techniques address the issues noted above, and are described in Examples 6-9. The disclosed techniques introduce a new data object class (or "type"), where an instance of the data object class includes switch information, in a similar manner as the technique to be discussed with respect to Example 4. However, the logic of the query optimizer is modified to recognize this new data object class. When the query optimizer encounters an instance of such an object, it retrieves contents of the object and considers such contents as part of query optimization, allowing for branch pruning, and allowing a greater number of relevant plans to be considered as part of the optimization process. Since the switching information is held in an instance of the object class, the contents of the "switch table" can be easily modified. When a modification is detected, the query optimizer can compile a new query plan. A query plan cache can maintain different versions of the query plan, including those based on different switch settings, and so those plans can be reused if a switch setting is reverted to a prior state.

The new data object class, which can be referred to as a "configuration object," can be a pure logical compile-time object (as compared with physical objects, which can be accessed during query execution, or execution objects, which can define operations for accessing physical objects during query execution), as that term is used in the field of relational databases. Unlike a prior approach that includes switching logic in a view definition, the configuration object may not be directly executable by an execution engine. Thus, a query optimizer may develop a logical query plan, after reading switch data from an instance of the configuration object and performing pruning operations, and then transform the logical query plan into an executable plan. This process can be referred to as "unfolding" an instance of the configuration object. Stated another way, in at least some implementations an instance of the configuration object is accessible to a query optimizer but not an execution engine, unlike prior approaches where switching information in a view is accessible to both the query optimizer and the execution engine. The unfolding process transforms the instance of the configuration object into selection statements that can be accessed by the execution engine in an executable query plan.

Example 2—Example Database Architecture

Database systems commonly operate using online transaction processing (OLTP) workloads, which are typically transaction-oriented, or online analytical processing (OLAP) workloads, which typically involve data analysis. OLTP transactions are commonly used for core business functions, such as entering, manipulating, or retrieving operational data, and users typically expect transactions or queries to be completed quickly. For example, OLTP transactions can include operations such as INSERT, UPDATE, and DELETE, and comparatively simple queries. OLAP workloads typically involve queries used for enterprise resource planning and other types of business intelligence. OLAP workloads commonly perform few, if any, updates to database records, rather, they typically read and analyze past transactions, often in large numbers.

FIG. 1 illustrates an example database environment 100. The database environment 100 can include a client 104. Although a single client 104 is shown, the client 104 can represent multiple clients. The client or clients 104 may be OLAP clients, OLTP clients, or a combination thereof.

The client 104 is in communication with a database server 106. Through various subcomponents, the database server 106 can process requests for database operations, such as requests to store, read, or manipulate data (i.e., CRUD operations). A session manager component 108 can be responsible for managing connections between the client 104 and the database server 106, such as clients communicating with the database server using a database programming interface, such as Java Database Connectivity (JDBC), Open Database Connectivity (ODBC), or Database Shared Library (DBSL). Typically, the session manager 108 can simultaneously manage connections with multiple clients 104. The session manager 108 can carry out functions such as creating a new session for a client request, assigning a client request to an existing session, and authenticating access to the database server 106. For each session, the session manager 108 can maintain a context that stores a set of parameters related to the session, such as settings related to committing database transactions or the transaction isolation level (such as statement level isolation or transaction level isolation).

For other types of clients 104, such as web-based clients (such as a client using the HTTP protocol or a similar transport protocol), the client can interface with an application manager component 110. Although shown as a component of the database server 106, in other implementations, the application manager 110 can be located outside of, but in communication with, the database server 106. The application manager 110 can initiate new database sessions with the database server 106, and carry out other functions, in a similar manner to the session manager 108.

The application manager 110 can determine the type of application making a request for a database operation and mediate execution of the request at the database server 106, such as by invoking or executing procedure calls, generating query language statements, or converting data between formats useable by the client 104 and the database server 106. In particular examples, the application manager 110 receives requests for database operations from a client 104, but does not store information, such as state information, related to the requests.

Once a connection is established between the client 104 and the database server 106, including when established through the application manager 110, execution of client requests is usually carried out using a query language, such as the structured query language (SQL). In executing the request, the session manager 108 and application manager 110 may communicate with a query interface 112. The query interface 112 can be responsible for creating connections with appropriate execution components of the database server 106. The query interface 112 can also be responsible for determining whether a request is associated with a previously cached statement or a stored procedure, and calling the stored procedure or associating the previously cached statement with the request.

At least certain types of requests for database operations, such as statements in a query language to write data or manipulate data, can be associated with a transaction context. In at least some implementations, each new session can be assigned to a transaction. Transactions can be managed by a transaction manager component 114. The transaction manager component 114 can be responsible for operations such as coordinating transactions, managing transaction isolation, tracking running and closed transactions, and managing the commit or rollback of transactions. In carrying out these operations, the transaction manager 114 can communicate with other components of the database server 106.

The query interface 112 can communicate with a query language processor 116, such as a structured query language processor. For example, the query interface 112 may forward to the query language processor 116 query language statements or other database operation requests from the client 104. The query language processor 116 can include a query language executor 120, such as a SQL executor, which can include a thread pool 124. Some requests for database operations, or components thereof, can be executed directly by the query language processor 116. Other requests, or components thereof, can be forwarded by the query language processor 116 to another component of the database server 106. For example, transaction control statements (such as commit or rollback operations) can be forwarded by the query language processor 116 to the transaction manager 114. In at least some cases, the query language processor 116 is responsible for carrying out operations that retrieve or manipulate data (e.g., SELECT, UPDATE, DELETE). Other types of operations, such as queries, can be sent by the query language processor 116 to other components of the database server 106. The query interface 112, and the session manager 108, can maintain and manage context information associated with requests for database operation. In particular implementations, the query interface 112 can maintain and manage context information for requests received through the application manager 110.

When a connection is established between the client 104 and the database server 106 by the session manager 108 or the application manager 110, a client request, such as a query, can be assigned to a thread of the thread pool 124, such as using the query interface 112. In at least one implementation, a thread is associated with a context for executing a processing activity. The thread can be managed by an operating system of the database server 106, or by, or in combination with, another component of the database server. Typically, at any point, the thread pool 124 contains a plurality of threads. In at least some cases, the number of threads in the thread pool 124 can be dynamically adjusted, such in response to a level of activity at the database server 106. Each thread of the thread pool 124, in particular aspects, can be assigned to a plurality of different sessions.

When a query is received, the session manager 108 or the application manager 110 can determine whether an execution plan for the query already exists, such as in a plan cache 136. If a query execution plan exists, the cached execution plan can be retrieved and forwarded to the query language executor 120, such as using the query interface 112. For example, the query can be sent to an execution thread of the thread pool 124 determined by the session manager 108 or the application manager 110. In a particular example, the query plan is implemented as an abstract data type.

If the query is not associated with an existing execution plan, the query can be parsed using a query language parser 128. The query language parser 128 can, for example, check query language statements of the query to make sure they have correct syntax, and confirm that the statements are otherwise valid. For example, the query language parser 128 can check to see if tables and records recited in the query language statements are defined in the database server 106.

The query can also be optimized using a query language optimizer 132. The query language optimizer 132 can manipulate elements of the query language statement to allow the query to be processed more efficiently. For example, the query language optimizer 132 may perform operations such as unnesting queries or determining an optimized execution order for various operations in the query, such as operations within a statement. After optimization, an execution plan can be generated, or compiled, for the query. In at least some cases, the execution plan can be cached, such as in the plan cache 136, which can be retrieved (such as by the session manager 108 or the application manager 110) if the query is received again.

For the purposes of the present disclosure, one task that can be performed by the query language optimizer 132 is determining whether an object referenced by the query is of a type whose contents are to be read during query optimization. If so, the query optimizer 132 can read the contents of the object, and use the contents in optimizing a query.

Once a query execution plan has been generated or received, the query language executor 120 can oversee the execution of an execution plan for the query. For example, the query language executor 120 can invoke appropriate subcomponents of the database server 106.

In executing the query, the query language executor 120 can call a query processor 140, which can include one or more query processing engines. The query processing engines can include, for example, an OLAP engine 142, a join engine 144, an attribute engine 146, or a calculation engine 148. The OLAP engine 142 can, for example, apply rules to create an optimized execution plan for an OLAP query. The join engine 144 can be used to implement relational operators, typically for non-OLAP queries, such as join and aggregation operations. In a particular implementation, the attribute engine 146 can implement column data structures and access operations. For example, the attribute engine 146 can implement merge functions and query processing functions, such as scanning columns.

In certain situations, such as if the query involves complex or internally parallelized operations or sub-operations, the query executor 120 can send operations or sub-operations of the query to a job executor component 154, which can include a thread pool 156. An execution plan for the query can include a plurality of plan operators. Each job execution thread of the job execution thread pool 156, in a particular implementation, can be assigned to an individual plan operator. The job executor component 154 can be used to execute at least a portion of the operators of the query in parallel. In some cases, plan operators can be further divided and parallelized, such as having operations concurrently access different parts of the same table. Using the job executor component 154 can increase the load on one or more processing units of the database server 106, but can improve execution time of the query.

The query processing engines of the query processor 140 can access data stored in the database server 106. Data can be stored in a row-wise format in a row store 162, or in a column-wise format in a column store 164. In at least some cases, data can be transformed between a row-wise format and a column-wise format. A particular operation carried out by the query processor 140 may access or manipulate data in the row store 162, the column store 164, or, at least for certain types of operations (such a join, merge, and subquery), both the row store 162 and the column store 164. In at least some aspects, the row store 162 and the column store 164 can be maintained in main memory.

A persistence layer 168 can be in communication with the row store 162 and the column store 164. The persistence layer 168 can be responsible for actions such as committing write transactions, storing redo log entries, rolling back transactions, and periodically writing data to storage to provided persisted data 172.

In executing a request for a database operation, such as a query or a transaction, the database server 106 may need to access information stored at another location, such as another database server. The database server 106 may include a communication manager 180 component to manage such communications. The communication manger 180 can also mediate communications between the database server 106 and the client 104 or the application manager 110, when the application manager is located outside of the database server.

In some cases, the database server 106 can be part of a distributed database system that includes multiple database servers. At least a portion of the database servers may include some or all of the components of the database server 106. The database servers of the database system can, in some cases, store multiple copies of data. For example, a table may be replicated at more than one database server. In addition, or alternatively, information in the database system can be distributed between multiple servers. For example, a first database server may hold a copy of a first table and a second database server can hold a copy of a second table. In yet further implementations, information can be partitioned between database servers. For example, a first database server may hold a first portion of a first table and a second database server may hold a second portion of the first table.

In carrying out requests for database operations, the database server 106 may need to access other database servers, or other information sources, within the database system, or at external systems, such as an external system on which a remote data object is located. The communication manager 180 can be used to mediate such communications. For example, the communication manager 180 can receive and route requests for information from components of the database server 106 (or from another database server) and receive and route replies.

The database server 106 can include components to coordinate data processing operations that involve remote data sources. In particular, the database server 106 includes a data federation component 190 that at least in part processes requests to access data maintained at remote system. In carrying out its functions, the data federation component 190 can include one or more adapters 192, where an adapter can include logic, settings, or connection information usable in communicating with remote systems, such as in obtaining information to help generate virtual parameterized data objects or to execute requests for data using virtual parameterized data objects (such as issuing a request to a remote system for data accessed using a corresponding parameterized data object of the remote system). Examples of adapters include "connectors" as implemented in technologies available from SAP SE, of Walldorf, Germany. Further, disclosed techniques can use technologies underlying data federation techniques such as Smart Data Access (SDA) and Smart Data Integration (SDI) of SAP SE.

Figure 2:
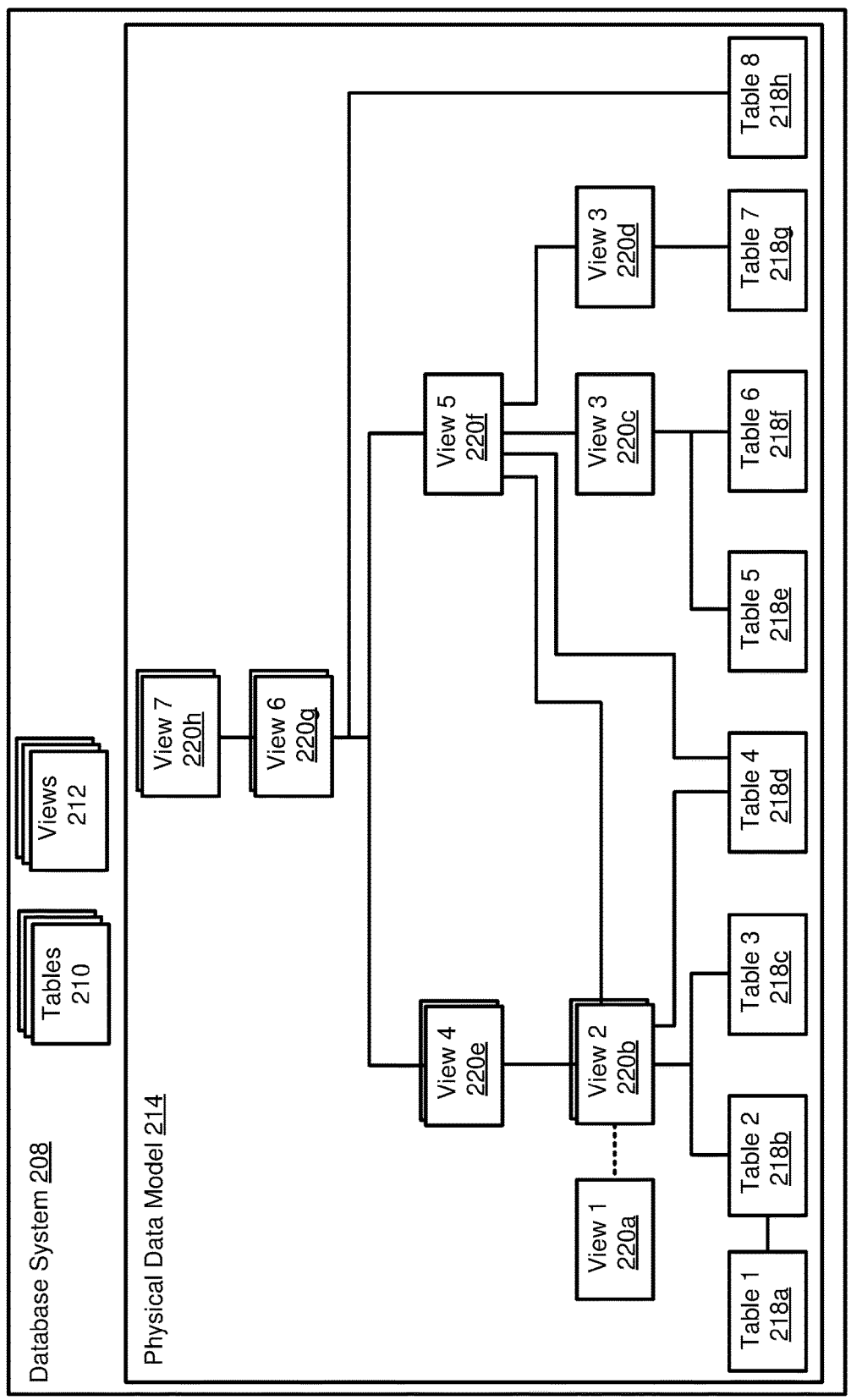
FIG. 2 is a diagram depicting a computing environment illustrating how clients can retrieve data from instances of data objects defined in a physical data model of a database system, including through logical data objects of software applications or objects in a virtual data model.

Example 3—Example Computing Environment with Physical Data Model Objects and Relationships Therebetween FIG. 2 illustrates a computing environment 200 that illustrates an example of how software applications can interact with data stored in a database system using objects in a virtual data model. FIG. 2 also illustrates how the database system can have objects in a physical data model, as well as relationships between such objects.

In particular, FIG. 2 illustrates a database system 208 that includes database tables 210 and database views 212. The database tables 210 can refer to one another, such as through foreign key relationships. The database views 212 can be defined with respect to other database views, with respect to tables 210, or with respect to a combination of other views and tables. The database tables 210 store data values. The views 212 can be used to dynamically obtain data, or data can be retrieved and stored in association with a view (referred to as a "materialized view").

The tables 210 and the views 212 represent instance of objects in a physical data model 214. That is, structures of tables 210 and views 212 can be defined in the physical data model 214, such as in an information schema or data dictionary. Instances of the tables 210 and views 212 can then be created and populated with data.

The physical data model 214 illustrates how model objects can be interrelated, including having hierarchical relationships. In particular, the physical data model 214 includes a plurality of tables 218 (shown as tables 218a-218h, and which could be more formally referred to as table definitions) and a plurality of views 220 (shown as views 220a-220h, and which could be more formally referred to as view definitions).

Table 218a is shown as having a relationship with table 218b, which could represent a foreign key relationship. As for hierarchical relationships between views 220, or between views and tables 218, view 220b is defined with respect to tables 218b and 218c. In turn, view 220e refers to view 220b, and view 220g refers to view 220e, as well as a view 220f and table 218h. View 220h refers to view 220g. Thus, views 220h, 220g, and 220e, and 220b all have a relationship, direct or indirect, with table 218b, and views 220h, 220g, and 220e all have a direct or indirect relationship with view 220b.

Higher level views can be affected by a change to a state associated with the table 218b or the view 220b. For example, assume the data associated with the view 220b is in a raw state. If that data switches from a raw state to a migrated state, it may be desired to switch from using view 220b with the views 220h, 220g, 220e to using another virtual data model object that references the migrated data, such as a view 220a.

Note that other relationships can change based on a change to a state of a particular object in the physical data model 214. For example, a view may change from an object with raw data to an object with migrated data. However, the raw or migrated objects may themselves refer to other data objects.

The views 220 can be of different types. For example, in database systems, such as HANA, available from SAP SE, of Walldorf, Germany, views can be defined as SQL views, calculation views, or projection views. SQL views can combine or simplify data stored in other database views or database tables. Calculation views can be considered as virtual view models that combine other views and data source (such as tables), and can be used to perform calculations or aggregations on such data. Projection views can be used to hide or change the order of fields in a particular table 218, to change field labels, or to alter how various user interface features may interact with fields of the table.

For a variety of reasons, end users and application processes often do not work directly with the tables 210 and views 212 (or their respective definitions). For example, a format used by the database system 208 may provide limited semantic information, such that it can be difficult to understand what a given database object and its components (for example, its attributes/fields) represent, and how they relate to other database objects. In addition, in many cases software applications, and their supporting object in the database system 208, are of critical importance to a company use information in the database 208, and so it may be desirable to restrict the number and type of users use can access database data, or database object definitions.

One way of addressing these issues with database objects is to introduce a virtual data model 240. The virtual data model 240 includes a plurality of virtual data model objects 242. The virtual data model objects 242 can be defined with respect to tables 218 and views 220 of the database system, or data objects in another system, including systems that store data in a non-relational format.

A software application 260 can access objects 242 in the virtual data model 240. In some cases, an application 260 can include logical data objects 262 that are defined with respect to the objects 242 in the virtual data model. A particular example of a logical data object 262 is a BUSINESSOBJECT, as implemented in technologies of SAP SE, of Walldorf, Germany.

The application 260 can be used by one or more clients 270. A given client 270 can include a client identifier 272. As will be explained, disclosed techniques allow for specifying state information for different categories or classes of data. For example, multiple clients 270 may use the software application 260, and the physical data model 214, but their information may be in different states. For example, one client 270 may have data associated with the view 220b in a migrated state, with another client may have the data for that view in a raw state. The client identifier 272 can be used to differentiate between the different states of information for the different clients 270. However, other types of classification information can be used to distinguish between states of different instances of the physical data model, such as when a single client 270 has one set of information for one geographical location and another set of information for a different geographical location.

Note that the tables 218 and views 220 of the physical data model 214 are shown as having multiple "instances" (nested rectangles). Each instance can represent a different state of the table 218 or the view 220, such as one instance for data in a raw state and one instance in a migrated state. In some cases, a given table 218 or view 220 can be associated with more than two instances, or can be associated with a single instance. In some cases, an instance of a table 218 or view 220 can reference data stored in another physical data model, including in a physical data model of another data store (such as another database system).

Example 4—Example Data Source Switching Using Table with Configuration Data

Figure 3:
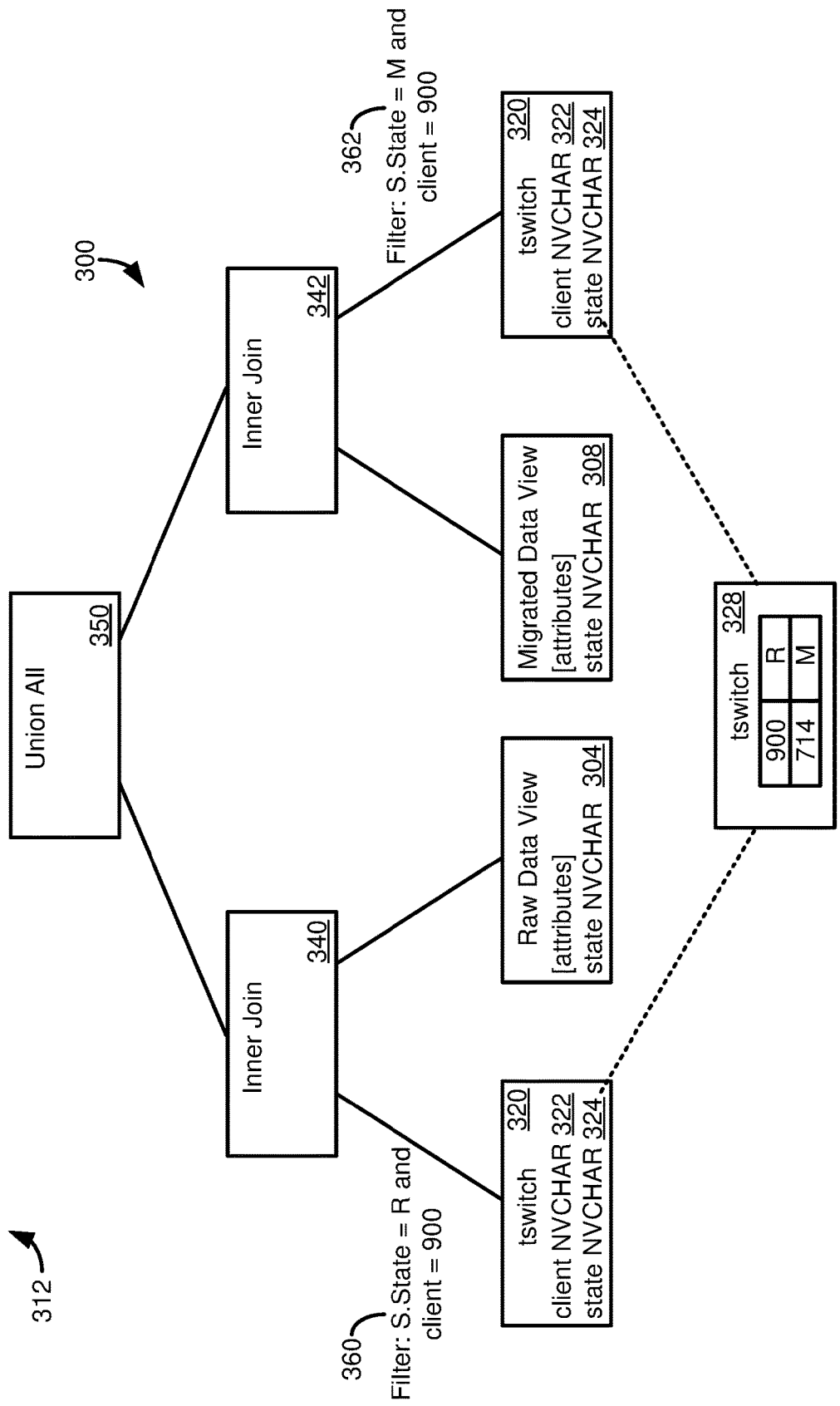
FIG. 3 illustrates a prior art method for switching between data sources for data using a configuration table.

FIG. 3 illustrates a prior process 300, such as a query plan, for switching between data sources, such as a view 304 that includes/retrieves raw data and a view 308 that includes/retrieves migrated data. Code 312 creates a table definition 320 that defines switching states 324 for two different values of a client attribute 322 of the table, and then inserts two sets of values (records) in an instance 328 of the table definition. Note that the process 300 is defined with respect to the definition 320 of the table provided by the first line of the code 312. That is, the process 300, in the form of a query plan, can be generated by a query optimizer with reference to the definition 320 of the table, but the query optimizer does not access data in the instance 328 of the table, having the value inserted into the table instance by the INSERT operations of the code 312.

The process 300 includes two inner join operations 340, 342. An inner join only returns records if both database objects include records having common values for particular, related attributes specified in a join condition. In this case, the inner join operation 340 joins the table instance 328 with the view 304 for raw data, while the inner join operation 342 joins the table instance 328 with the view 308 for migrated data. The results of the inner joins 340, 342 are combined in a union all operation 350.

During query execution, a filter condition can be selected, as illustrated for filter conditions 360, 362. Filter 360 selects raw data, by providing a value of "R" for the state attribute 324 of the table 320, while filter 362 selects migrated data, by providing a value of "M" for the state attribute. If filter condition 360 is used, providing a value of "R," values of the state attribute 324 of the table instance 328 will match values of the state attribute of the view 304, and so values will be returned from the inner join 340, and collected by the union all operation 350. In this case, the join operation 342 is also evaluated. However, since the table instance 328 does not include a value of "M," no records of the table instance 328 will match records associated with the view 308, having a state a state value of "M." Thus, the join operation 342 will not return query results.

The client attribute 322 of the table definition 320 allows different states (values of the state attribute 324) to be set for different clients, but can be omitted if the data is only associated with a single client. Or, one or more attributes in addition to the state attribute 324 can be included as selection criteria.

An advantage of the process 300 is that end users/application processes can easily modify the table instance 328 by performing insert, delete, or update operations. However, as explained in Example 1, a drawback of the process 300 is that the branches (corresponding to the inner joins 340, 342) are not evaluated until runtime, and the query optimizer thus cannot prune the branches at the time of plan compilation, since the contents of the table instance 328 are not available to the query optimizer. While the process 300 is relatively simple for the purposes of explanation, in practice processes will be much more complex. For example, each of the tables 218 or views 220 of the computing environment 200 of FIG. 2 can be associated with two or more data sets, corresponding to different states of the data set, creating a much more complex query plan. In practice, many data models are much more complex than the physical data model 214 of FIG. 2. Generally, plan enumeration grows exponentially with the number of tables and predicates in a query.

Example 5—Example Data Source Switching Using Data Object Definitions

Figure 4A:
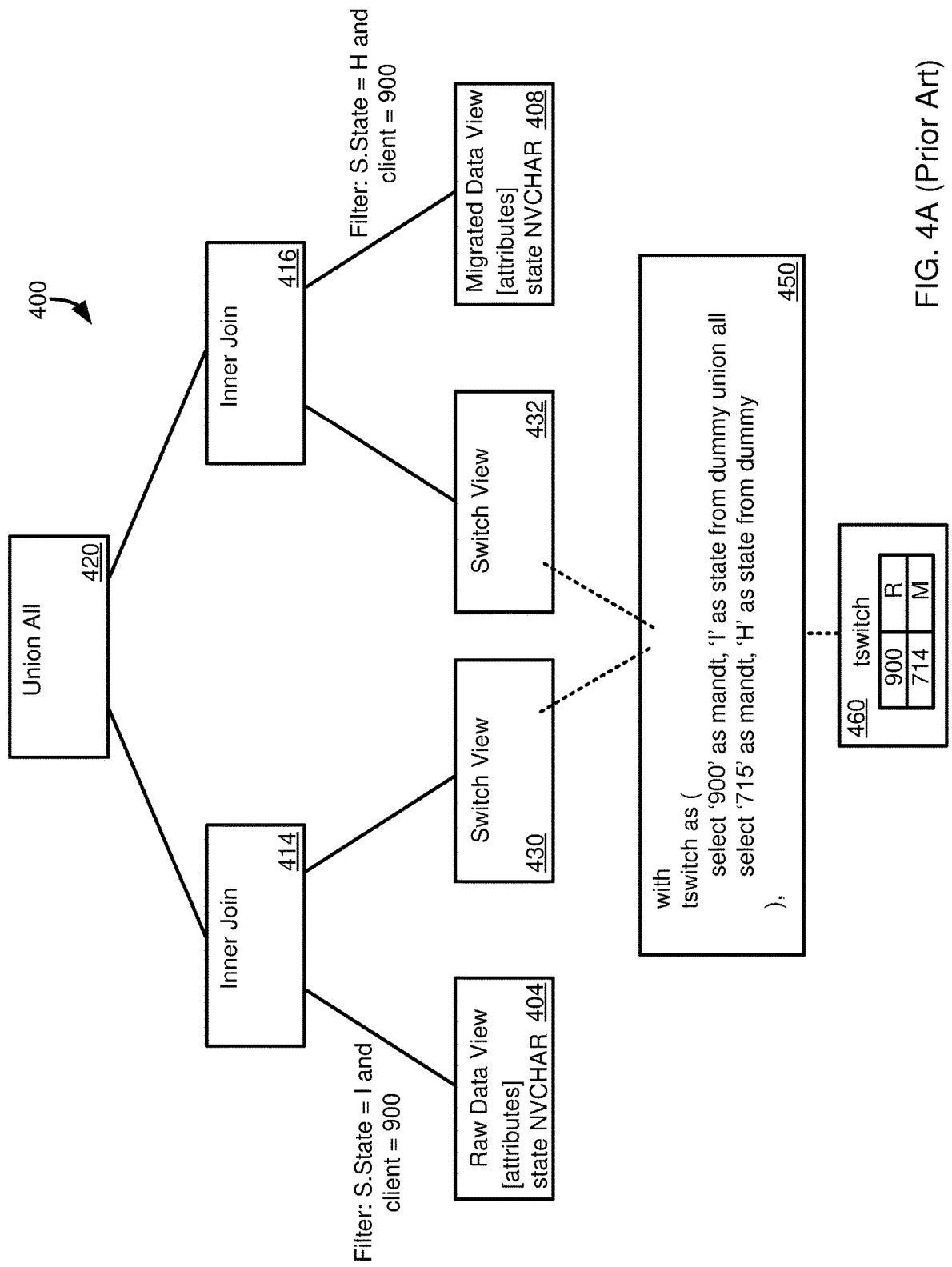
FIGS. 4A and 4B illustrate a prior art method for switching between data sources for data using switching information included in a definition of a data object referenced in a query.
Figure 4B:
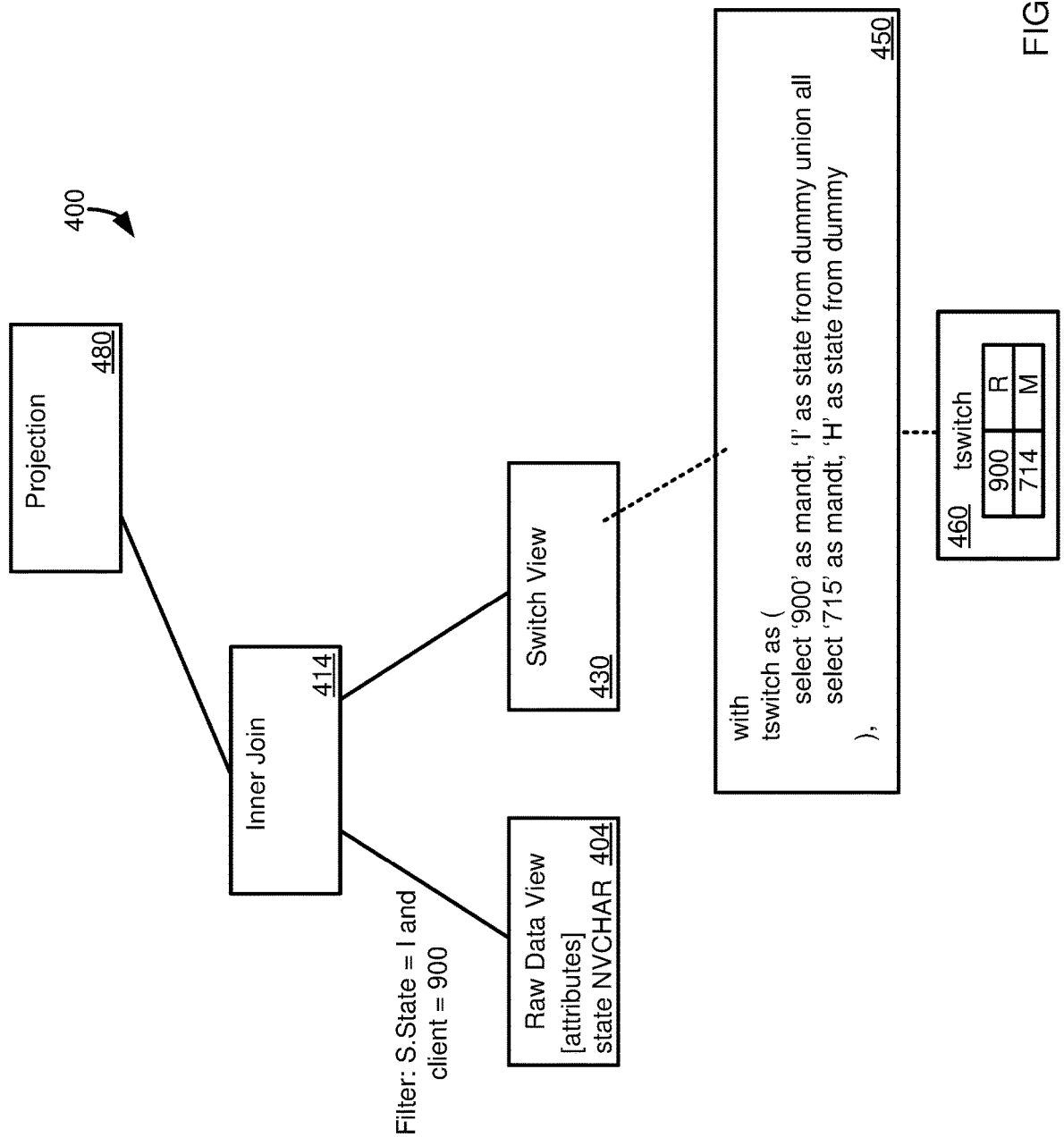

FIGS. 4A and 4B illustrates an alternative prior process 400, such as a query plan, for switching between data sources, such as a view 404 that includes/retrieves raw data and a view 408 that includes/retrieves migrated data. The views 404, 408 can be at least generally similar to the views 304, 308 of FIG. 3. The process 400 further includes inner join operations 414, 416, which can be at least generally as described for the inner join operations 340, 342. Similarly, a union all operator 420 can collect results of the inner join operations 414, 416 in a similar manner as the union all operator 350 collects results of the inner join operations 340, 342.

In the process 400, rather than having the having the inner join operations 414, 416 reference a table instance having switching information, the inner join operations reference respective switch views 430, 432. A respective switch view 430, 432 can select data from a respective view 404, 408. The switch views 430, 432 each incorporate a switching condition 450, in the form of a common table expression (for example, as implemented in technologies of SAP SE, of Walldorf, Germany). The common table expression defines a virtual table having the form of a table 460, which is analogous to the switching table instance 328 of FIG. 3. However, since the table 460, including its contents, are defined in the switch views 430, 432, the contents are visible to the query optimizer.

When query plan compilation is requested, the query optimizer can use the contents of the table 460 to determine that inner join 416 need not be considered, since the values of the table will not match values of the view 408 (since the state is "R" instead of "M"), and this branch can be pruned from further consideration, as illustrated in FIG. 4B, where the union all operation 420 has been replaced with a projection operation 480.

As described in Example 1, while this approach can be beneficial as facilitating query optimization, it requires the definition of new switching views, or updates of switching views, whenever a state of a particular data object changes. Further, the definition of the switch views and common table expressions, or other switching clause/option, can be complex, making a data model more complicated to create, maintain, or interpret. In addition, objects in a physical data model often have restricted access, and so end users or application processes may not have permission to modify/insert/delete the switch views/switching expression when a switch occurs.

Example 6—Example Data Source Switching Using Compilation Object Type

Figure 5B:
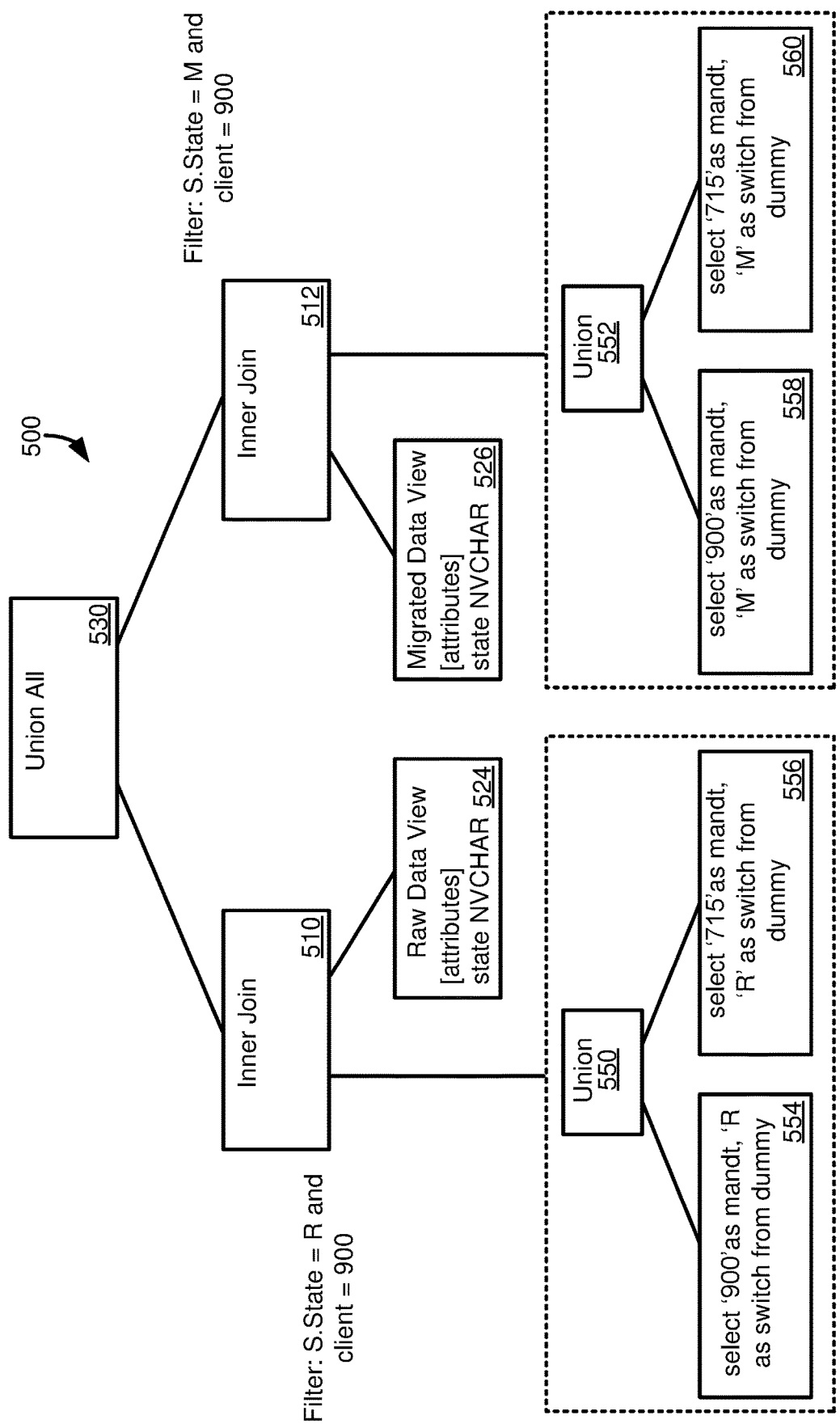

FIGS. 5A-5B illustrate a process accordingly to present disclosure for switching queries between different data sources based on state information. FIG. 5A illustrates a process 500 that is generally similar to the process 300 of FIG. 3, in that includes inner joins 510, 512 that reference a switch table definition 516, that has an instance 520 with particular switch values. The inner joins 510, 512 also reference, respectively a view 524 for raw data and a view 526 for migrated data. Output of the inner joins 510, 512 is collected by a union all operation 530.

Code 534 defines the switch table definition 516, and inserts values for the instance 520 of the switch definition table. However, note that line 536 of the code 534 defines the "tswitch" table as "compileconfiguration" table. This table type is of a type that the query optimization is programmed to process differently than other ("normal") table types. That is, while the query optimizer typically does not retrieve contents of a table (or other database object) referenced in the query during optimization, the table being a compile-configuration table serves as a flag for the query optimizer to handle the table in a different manner, and retrieve contents of the table for the purposes of query optimization. Of course, other keywords can be used for a table type that is used in this manner.

FIG. 5B illustrates the process 500 after "unfolding" the configuration table instance 520. The configuration table instance 520 has been unfolded for both inner joins 510, 512 as respective union operations 550, 552 on respective sets of views 554, 556 and 558, 560. The views 554, 556, 558, 560 correspond to selection statements generated based on the contents of the instance 520 of the configuration table.

Figure 5C:
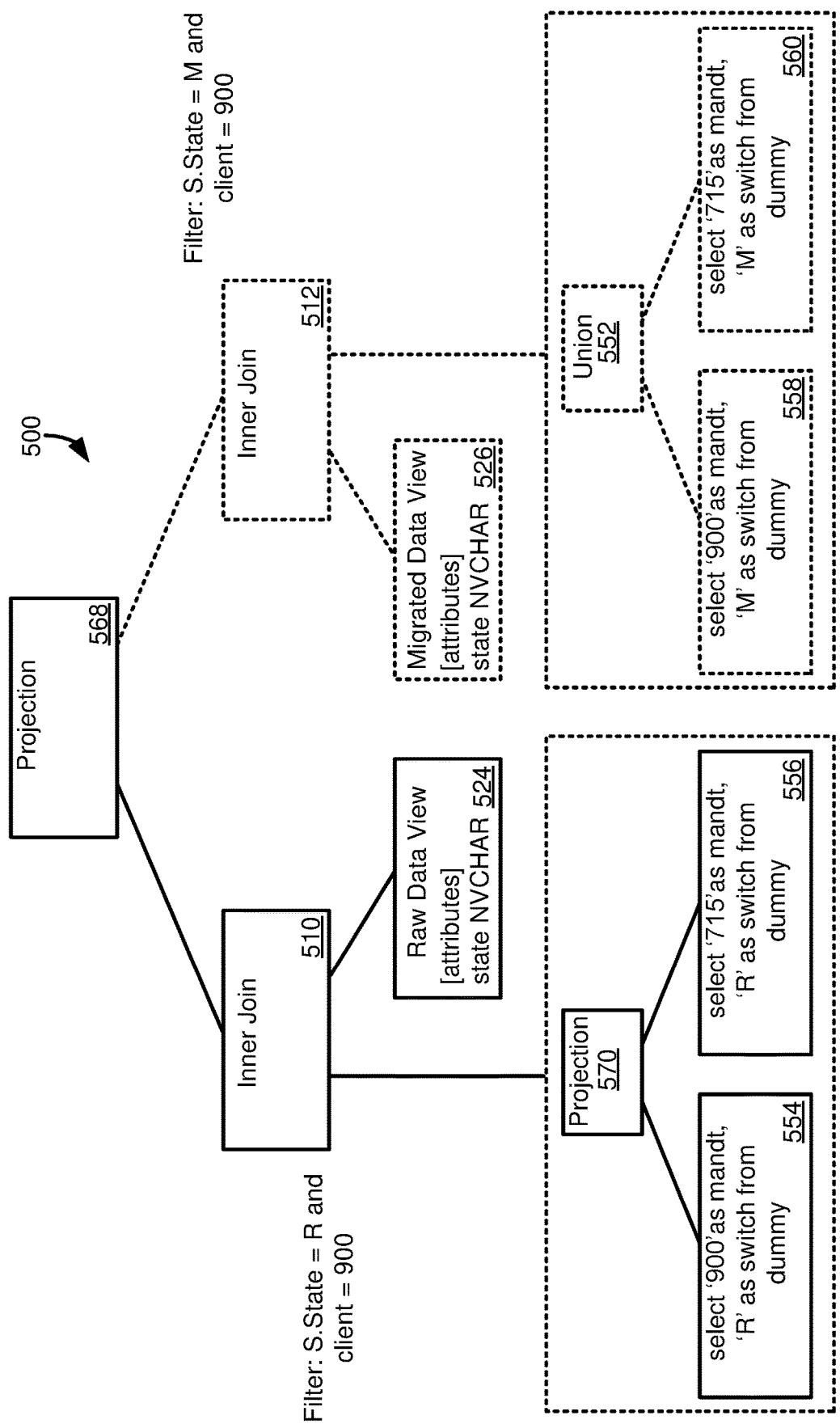

FIG. 5C illustrates the process 500 after pruning. The union all operation 530 has been rewritten as a projection operation 568, and the union operation 550 has been rewritten as projection operation 570. The branch of the process 500 that includes the view 508 has been removed/pruned, as indicated by dashed lines in FIG. 5C.

Figure 5D:
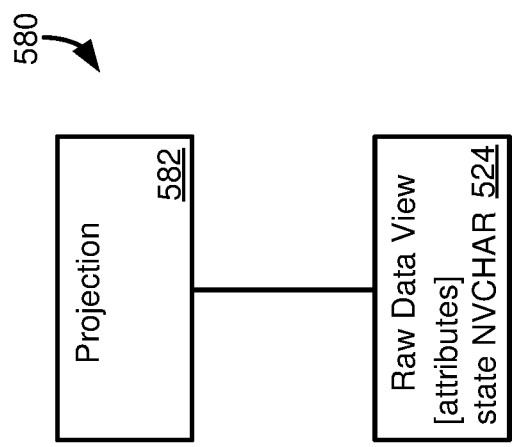

After considering the union operation 530 and pruning the joins 510, 520, a final logical query plan 580 is created, as shown in FIG. 5D, having a projection operation 582 on the view 524.

FIGS. 5A-5D illustrate that making contents of the switching table instance 520 available to the query optimizer allows for branch pruning at the time of query optimization/compilation. When the query optimizer accesses the data in the switching table instance 520, it can determine that no records will be retrieved from the inner join 512. In the example, the view 560 can be removed from optimization based on the client value provided in the query. View 556 can be removed using a similar analysis.

The inner join 512 can be pruned since the query optimizer can determine that the join condition will not be satisfied using the views 526, 558, since "R" switching state is present in the table instance 520, rather than the "M" switching state.

Figure 6A:
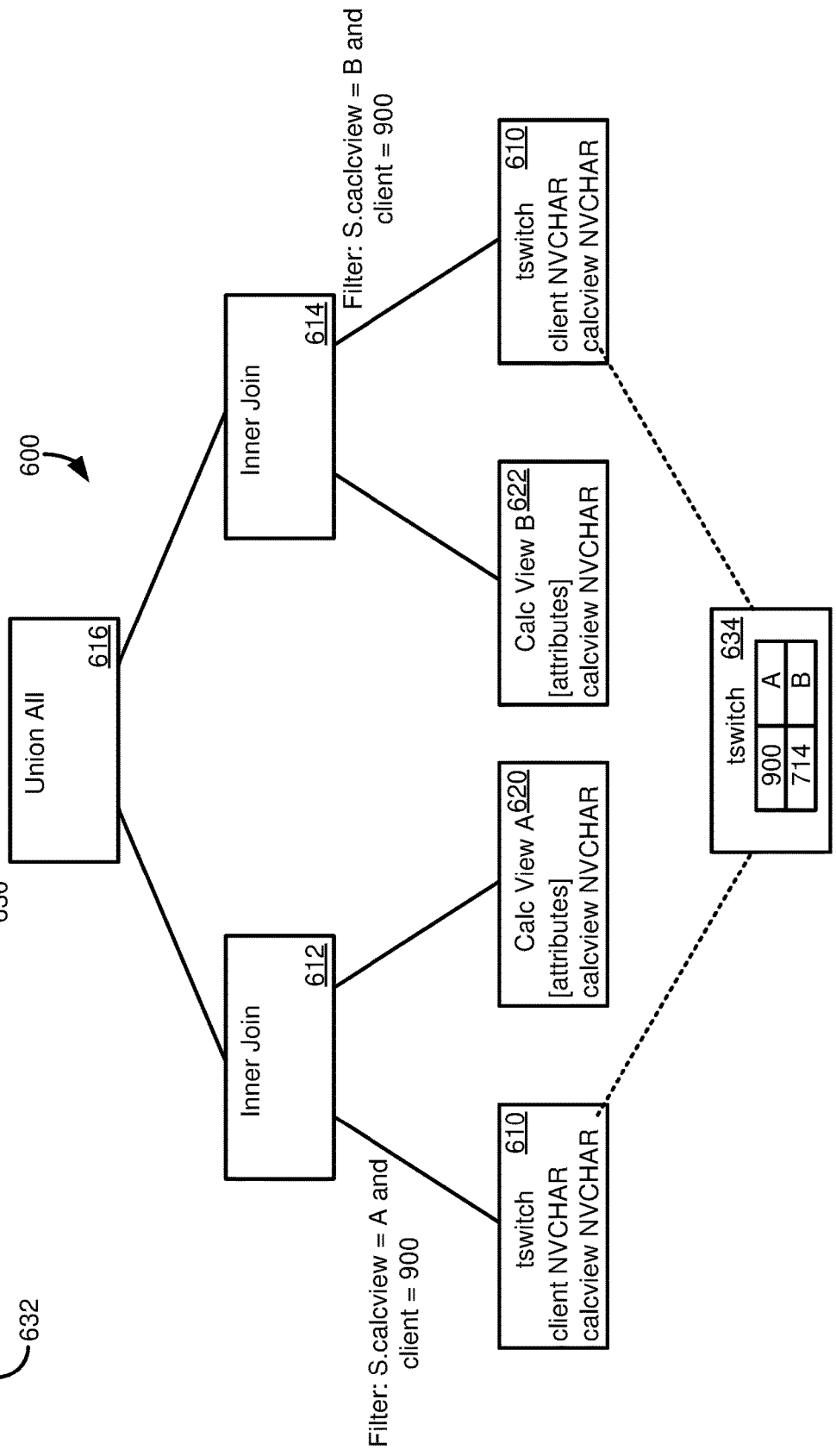
FIG. 6A illustrates an example scenario with which disclosed techniques can be used, where different calculation views can be specified for different clients, including where clients can be dynamically switched between calculation views.

FIG. 6A illustrates another process, 600, where the technique described with respect to FIGS. 5A-5D can be used. The process 600 is generally similar to that shown in FIG. 5A for the process 500, however, rather than switching between views for raw and migrated data, switching is between different calculation views 620, 622. The different calculation views 620, 622 can represent calculation views that have been defined to meet the needs of different clients, or which have been optimized for a particular purpose, such as being optimized for transactional processing or being optimized for analytical processing.

The calculation views 620, 622 are joined to a configuration table 610, using respective inner joins 612, 614, where in turn the results of the inner joins are collected by a union all operation 616. The switch table 610 is defined using a command 628, and values are inserted into the instance using commands 630, 632 to provide an instance 634 of the switch table.

During runtime, the process 600 can be evaluated in a similar manner as described for the process 500 of FIG. 5A. In particular, a client identifier provided in a query can be used to select the appropriate calculation view 620, 622 using the instance 634 of the switch table. The inner join 614 for the unset/unselected state can be pruned by the query optimizer.

Figure 6B:
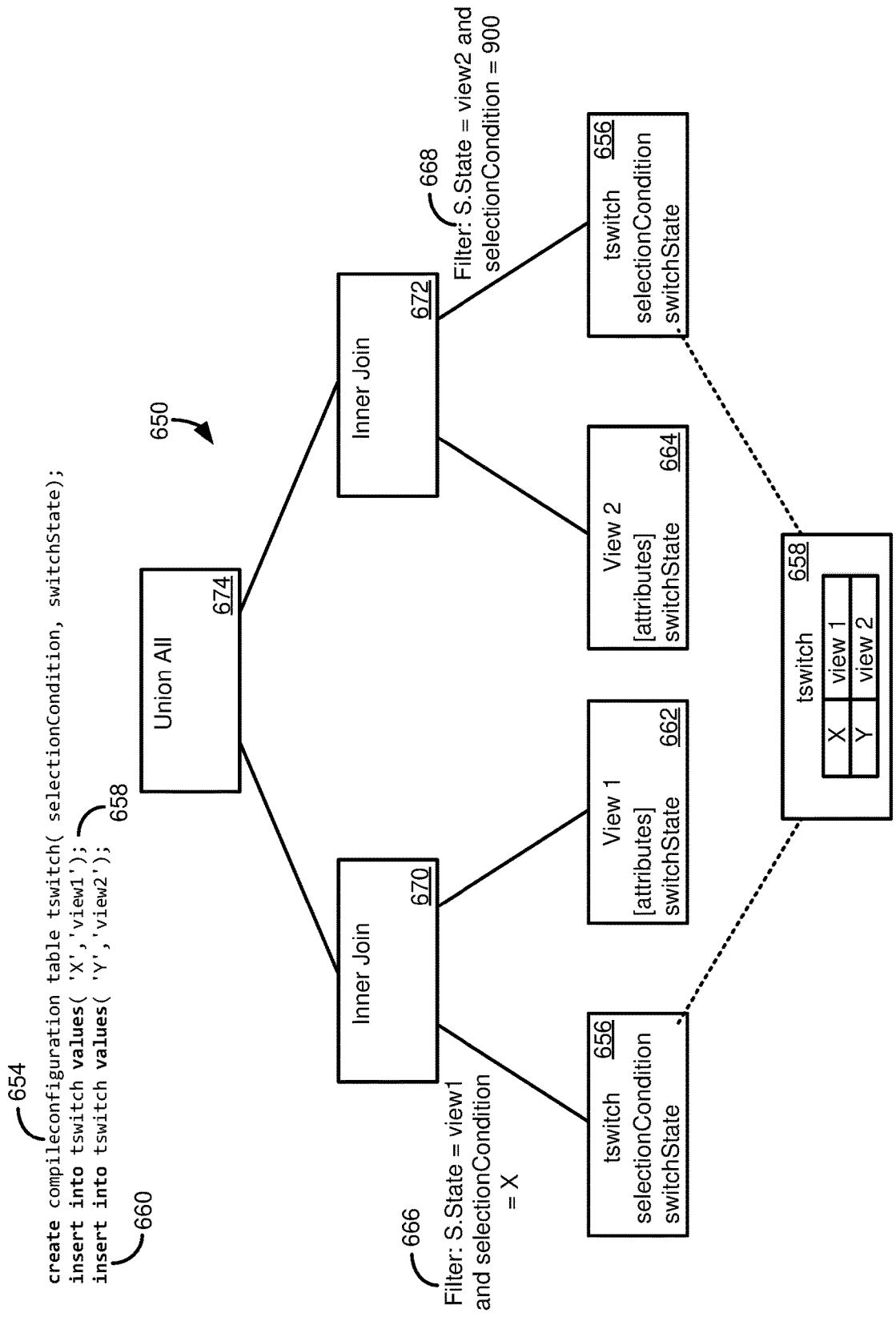
FIGS. 6B and 6C illustrate a general use case for disclosed techniques, where switching between two views is configured for two different values of a selection condition, where the selection condition can be, for example, a client identifier.
Figure 6C:
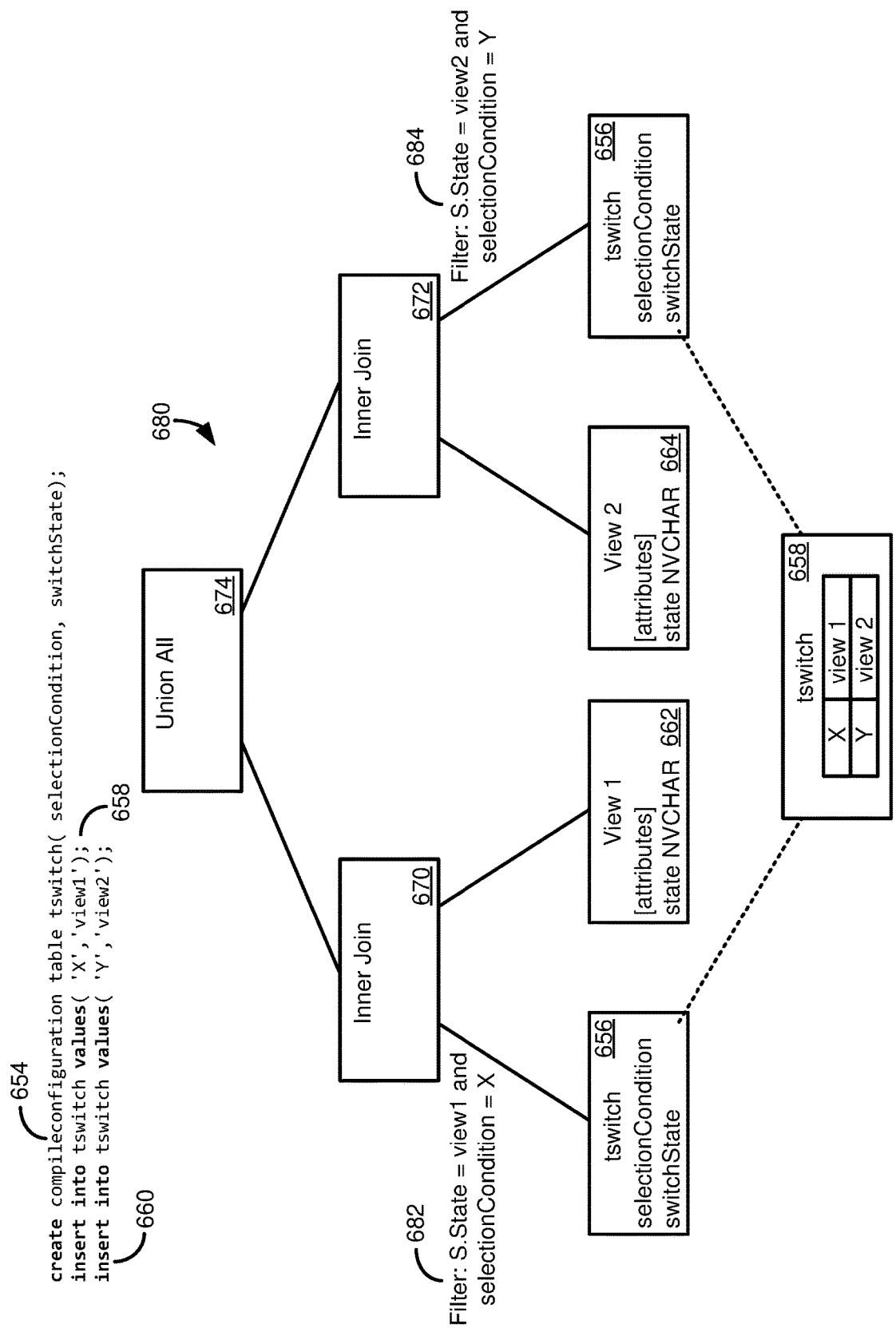

FIGS. 6B and 6C illustrate more generalized processes 650, 680 of disclosed innovations. In the processes 650, 680, command 654 defines a configuration table 656, which is defined as an object type whose contents are readable by a query optimizer. In this case, the configuration table defined by the command 654 has an attribute reflecting a value of a selection condition, "selectionCondition" (such as a client identifier), and an attribute, "switchState," that indicates which of multiple views is specified for a particular value of the selection condition attribute. Commands 658, 660 insert values into the configuration table 656 to provide an instance 658 of the configuration table, where the possible selection condition values are "X" and "Y," and where the available views 662, 664 are "view 1" and "view 2."

The processes 650 and 680 are identical, other than the value of filter conditions 666, 668 (FIG. 6B) and 682, 684 (FIG. 6C). The filter conditions 666, 668 of FIG. 6B are for the selection condition value of "X," while the filter conditions 682, 684 of FIG. 6C are for the selection condition value of "Y." Otherwise, both process 650, 680 include inner joins 670, 672 between the instance 656 of the configuration table and respective views 662, 664. The result of the inner joins 670, 672 are collected by a union all operation 674.

Example 7—Example Query Optimization

Figure 7:
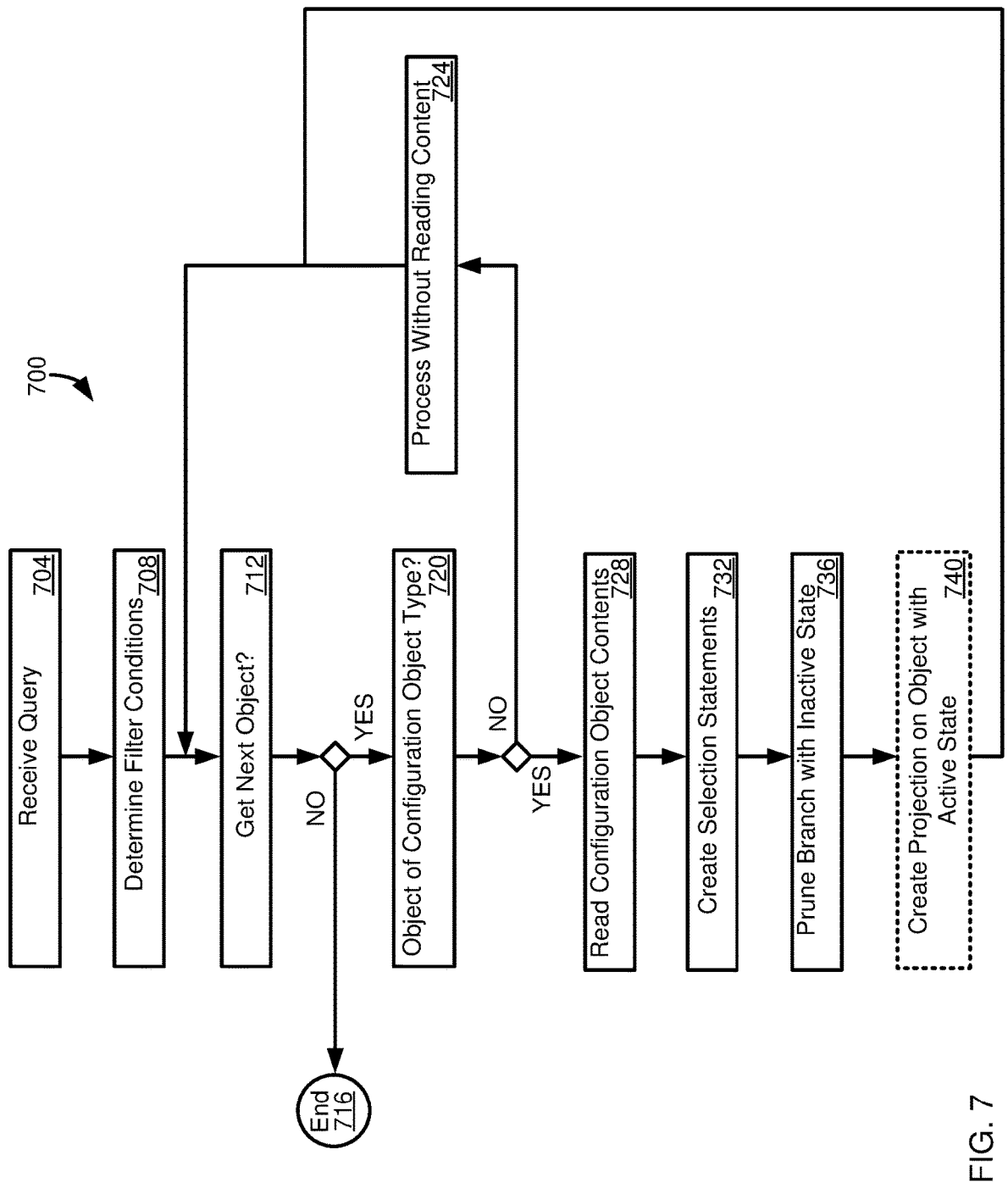
FIG. 7 is a flowchart of an example query optimization process using disclosed techniques.

FIG. 7 is a process 700 illustrating example operations of a query optimizer according to disclosed techniques. A query is received at 704. In at least some cases, the query can include one or more filter conditions, such as filtering by a company identifier or a client identifier. If filter conditions are specified, they are determined at 708.

It is determined at 712 whether additional objects, such as tables or views, are to be processed by the query optimizer as part of optimizing the query. If no additional objects are present, the process 700 can terminate at 716.

Otherwise, it is determined at 720 whether the next object is an object of a configuration object type, such as the compileconfiguration table described above. If the object is not of the configuration object type, the object is processed by the query optimizer without reading content/data for the object (as opposed to metadata for the object, such as metadata providing a definition of the object) at 724. The process 700 then returns to 712.

If it is determined at 720 that the next object is an object of a configuration object type, the process 700 proceeds to 728, where contents of the configuration object are read. In the case where conditions were determined at 708, selection clauses corresponding to different filter values, specified in the configuration object, are created at 732. Selection clauses are also created at 732 for different states for the configuration object (for each filter value specified in the configuration object, and where the different states can be, for example a data source for data in a raw state or a data source for data in a migrated state).

At 736, branches in the query plan are pruned where no records would be returned based on state information included in the configuration object. That is, for example, if the configuration object specifies a state where raw data is to be used, a branch with a selection clause on migrated data would be pruned. Optionally, a projection operation can be defined at 740 based on the selection clause created based on the configuration object. The projection operation can, for example, implement filter conditions determined at 708. In the case of a filter based on a client identifier, a data source may store information for multiple clients, and so the projection operation can retrieve information specific to a client identifier provided as a literal in a query for which a query plan is being created. The process 700 can then return to 712.

Note that the process 700 can have differences from the specific example of FIG. 7. For instance, rather than creating multiple selection statements at 732, a single selection statement can be created for an object based on the state for the object specified in the configuration table. Thus, the selection statement for other, inactive states, are "pruned" in a way, but because they are never created/evaluated, rather than being created and then pruned after determining that no results will be returned by the operation.

Example 8—Example Query Plan Recompilation on Change to Compilation Objects

Figure 8:
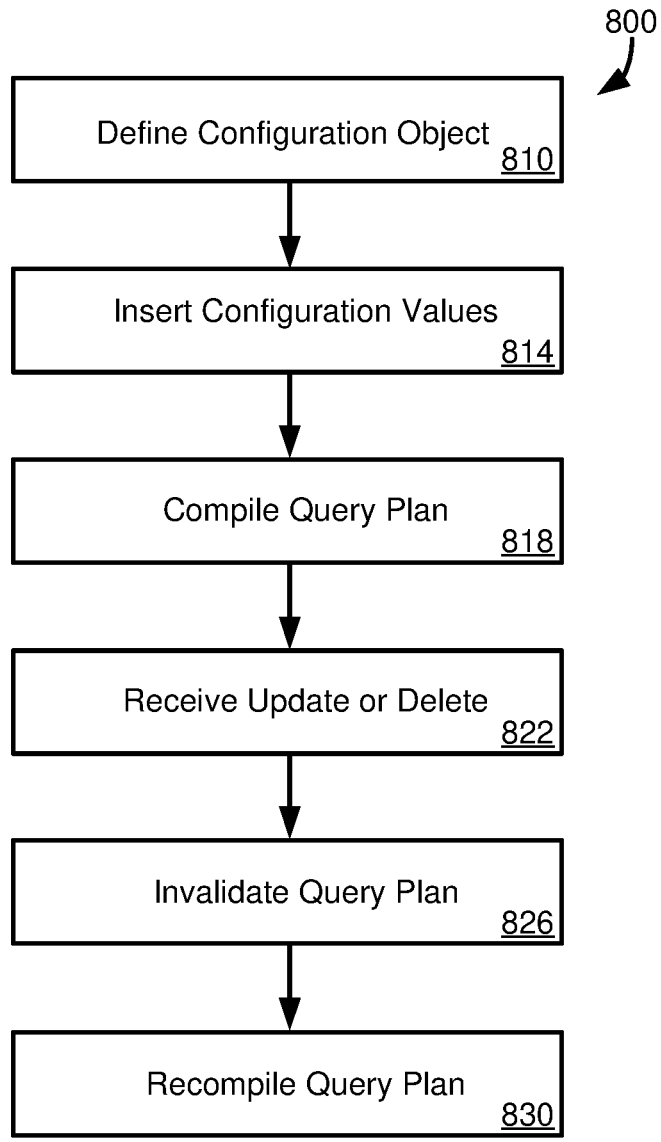
FIG. 8 is a flowchart of a process of recompiling a query plan based on a change to an object of a type that is recognized by a query optimizer and whose data is read during query optimization.

As discussed in Examples 1, 6, and 7, an advantage of disclosed techniques is that state information can be easily changed, in addition to being visible to a query optimizer. For example, information in a configuration object that is defined to be read by the query optimizer can be changed through insert, delete, or update operations. For example, switching between a view having raw data and a view having migrated data can be accomplished by deleting a row in the configuration object specifying the raw data and inserting a row specifying the migrated data, or by updating the row to change a value of a status attribute from raw to migrated. FIG. 8 illustrates a process 800 for making a change to a status associated with a particular database object.

A configuration object is defined at 810. The configuration object is defined as a type that will be recognized by the query optimizer, such that the query optimizer will read the object's contents as part of query optimization. At least a first configuration value is inserted into the configuration object at 814. The query plan is compiled at 818, such as using the process 700 of FIG. 7.

An update or delete operation is received for the configuration object at 822. At 826, the version of the query plan created at 818 is invalidated. The query plan is recompiled at 830, using the update status information in the configuration object.

Example 9—Example Operations

Figure 9:
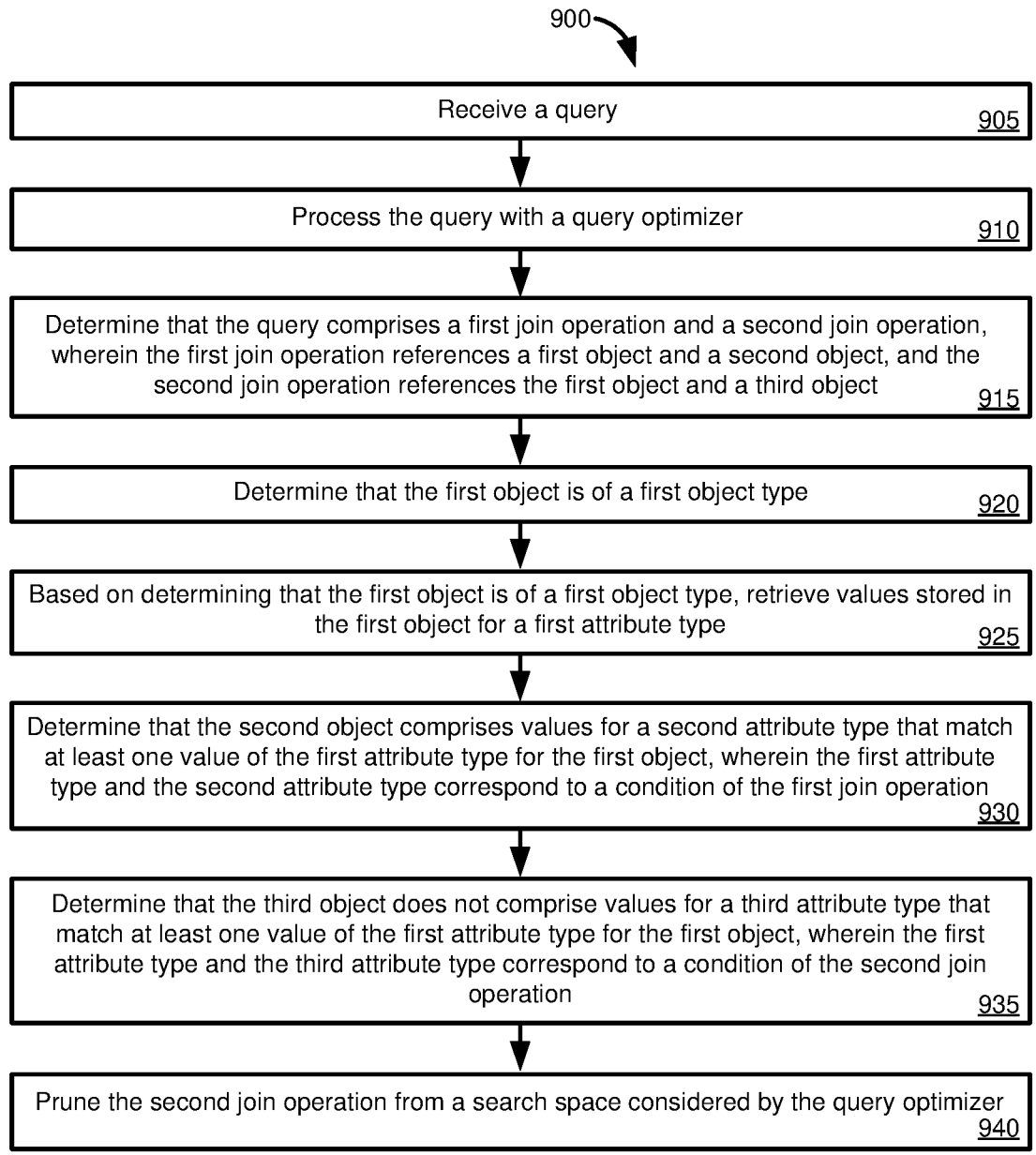
FIG. 9 is a flowchart of a process of optimizing a query that may access different objects using information switching information.

FIG. 9 illustrates a process 900 of optimizing a query that may access different objects using information switching information. A query is received at 905. At 910, the query is processed with a query optimizer. Processing the query with the query optimizer includes, at 915, determining that the query includes a first join operation and a second join operation, where the first join operation references a first object and a second object, and the second join operation references the first object and a third object.

It is determined at 920 that the first object is of a first object type. At 925, based on determining that the first object is of a first object type, values stored in the first object for a first attribute type are retrieved. It is determined at 930 that the second object includes values for a second attribute type that match at least one value of the first attribute type for the first object, where the first attribute type and the second attribute type correspond to a condition of the first join operation. It is determined at 935 that the third object does not comprise values for a third attribute type that match at least one value of the first attribute type for the first object, where the first attribute type and the third attribute type correspond to a condition of the second join operation. At 940, the second join operation is pruned from a search space considered by the query optimizer.

Example 10—Computing Systems

Figure 10:
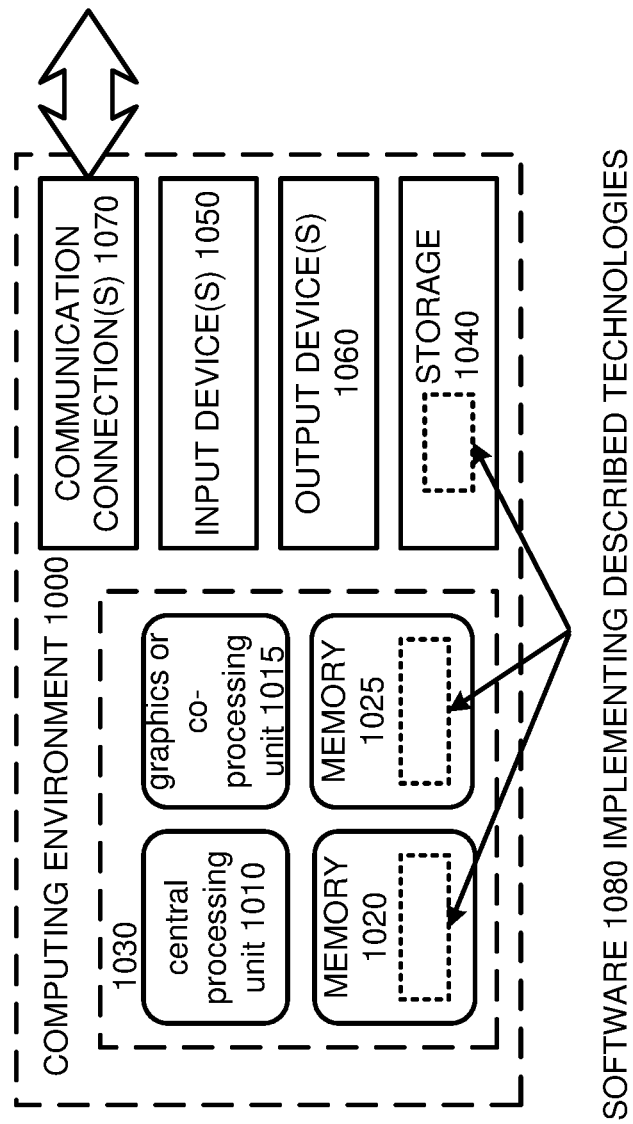
FIG. 10 is a diagram of an example computing system in which some described embodiments can be implemented.

FIG. 10 depicts a generalized example of a suitable computing system 1000 in which the described innovations may be implemented. The computing system 1000 is not intended to suggest any limitation as to scope of use or functionality of the present disclosure, as the innovations may be implemented in diverse general-purpose or special-purpose computing systems.

With reference to FIG. 10, the computing system 1000 includes one or more processing units 1010, 1015 and memory 1020, 1025. In FIG. 10, this basic configuration 1030 is included within a dashed line. The processing units 1010, 1015 execute computer-executable instructions, such as for implementing a database environment, and associated methods, as described herein. A processing unit can be a general-purpose central processing unit (CPU), a processor in an application-specific integrated circuit (ASIC), or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), non-volatile memory (e.g., ROM, EEPROM, flash memory, etc.), or some combination of the two, accessible by the processing unit(s) 1010, 1015. The memory 1020, 1025 stores software 1080 implementing one or more innovations described herein, in the form of computer-executable instructions suitable for execution by the processing unit(s) 1010, 1015.

A computing system 1000 may have additional features. For example, the computing system 1000 includes storage 1040, one or more input devices 1050, one or more output devices 1060, and one or more communication connections 1070. An interconnection mechanism (not shown) such as a bus, controller, or network interconnects the components of the computing system 1000. Typically, operating system software (not shown) provides an operating environment for other software executing in the computing system 1000, and coordinates activities of the components of the computing system 1000.

The tangible storage 1040 may be removable or non-removable, and includes magnetic disks, magnetic tapes or cassettes, CD-ROMs, DVDs, or any other medium which can be used to store information in a non-transitory way, and which can be accessed within the computing system 1000. The storage 1040 stores instructions for the software 1080 implementing one or more innovations described herein.

The input device(s) 1050 may be a touch input device such as a keyboard, mouse, pen, or trackball, a voice input device, a scanning device, or another device that provides input to the computing system 1000. The output device(s) 1060 may be a display, printer, speaker, CD-writer, or another device that provides output from the computing system 1000.

The communication connection(s) 1070 enable communication over a communication medium to another computing entity, such as another database server. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 11—Cloud Computing Environment

Figure 11:
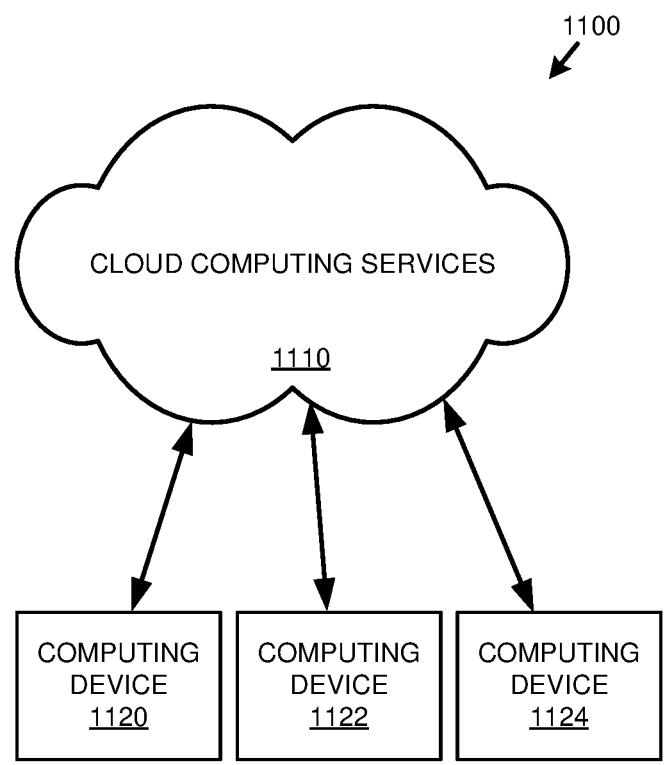
FIG. 11 is an example cloud computing environment that can be used in conjunction with the technologies described herein.

FIG. 11 depicts an example cloud computing environment 1100 in which the described technologies can be implemented. The cloud computing environment 1100 comprises cloud computing services 1110. The cloud computing services 1110 can comprise various types of cloud computing resources, such as computer servers, data storage repositories, networking resources, etc. The cloud computing services 1110 can be centrally located (e.g., provided by a data center of a business or organization) or distributed (e.g., provided by various computing resources located at different locations, such as different data centers and/or located in different cities or countries).

The cloud computing services 1110 are utilized by various types of computing devices (e.g., client computing devices), such as computing devices 1120, 1122, and 1124. For example, the computing devices (e.g., 1120, 1122, and 1124) can be computers (e.g., desktop or laptop computers), mobile devices (e.g., tablet computers or smart phones), or other types of computing devices. For example, the computing devices (e.g., 1120, 1122, and 1124) can utilize the cloud computing services 1110 to perform computing operators (e.g., data processing, data storage, and the like).

Example 12—Implementations

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 10, computer-readable storage media include memory 1020 and 1025, and storage 1040. The term computer-readable storage media does not include signals and carrier waves. In addition, the term computer-readable storage media does not include communication connections (e.g., 1070).

Any of the computer-executable instructions for implementing the disclosed techniques, as well as any data created and used during implementation of the disclosed embodiments, can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, SQLSCRIPT, Python, Ruby, ABAP, Structured Query Language, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
    at least one memory;
    one or more hardware processor units coupled to the at least one memory; and
    one or more computer readable storage media storing computer-executable instructions that, when executed, cause the computing system to perform operations comprising:
        receiving a query that recites operations using a first object, a second object, and a switch object;
        processing the query with a query optimizer to generate a query plan, the processing the query with the query optimizer comprising:
            determining that the query comprises a first join operation and a second join operation, wherein the first join operation references the switch object and the first object, and the second join operation references the switch object and the second object;
            based on determining that the switch object is of a switch object type, retrieving values stored in the switch object for a first attribute type, wherein the values stored in the switch object are dynamically modifiable to affect whether the first join operation or the second join operation is used in preparing the query plan;
            determining that the first object comprises values for a second attribute type that match at least one value of the first attribute type retrieved from the switch object, wherein the first attribute type and the second attribute type correspond to a condition of the first join operation;
            determining that the second object does not comprise values for a third attribute type that match at least one value of the first attribute type for the switch object, wherein the first attribute type and the third attribute type correspond to a condition of the second join operation; and
            pruning the second join operation from a search space considered by the query optimizer based on determining that the second object does not comprise values for the third attribute type that match at least one value of the first attribute type for the switch object.

2. The computing system of claim 1, wherein the first object and the second object represent different sources of equivalent values for a first set of one or more equivalent attributes.

3. The computing system of claim 2, wherein the switch object is included in a third join with a third object and in a fourth join with a fourth object, wherein the third object and the fourth object represent different sources of equivalent values for a second set of one or more equivalent attributes, wherein at least a portion of the attributes of the second set of one or more equivalent attributes differ from attributes of the first set of one or more equivalent attributes.

4. The computing system of claim 1, wherein the switch object comprises a fourth attribute type, the operations further comprising:
    comparing one or more values specified in the query with values for the fourth attribute type in the switch object; and
    pruning operations involving the switch object that do not comprise the one or more values specified in the query.

5. The computing system of claim 4, wherein a first record of the switch object comprises a first value for the first attribute type of the switch object for a first value of the fourth attribute type and a second record of the switch object comprises a second value of the fourth attribute type.

6. The computing system of claim 5, wherein one or more values of the fourth attribute type are specified in the query.

7. The computing system of claim 1, wherein the switch object comprises a fourth attribute type, the operations further comprising:
   comparing one or more values specified in the query with values for the fourth attribute type in the switch object;
   defining a first select operation for a first value for the fourth attribute type in the switch object;
   defining a second select operation for a second value for the fourth attribute type in the switch object;
   determining that the second value is not comprised with the one or more values specified in the query;
   pruning the second select operation; and
   retrieving from the first object values for one or more additional attributes of the first object for records having the first value of the second attribute type for an attribute of the first object.

8. The computing system of claim 1, the operations further comprising:
   receiving a change to a value of the first attribute type of the switch object;
   invalidating a query plan produced by the processing the query; and
   recompiling the query plan using a new value of the first attribute type provided by the change.

9. The computing system of claim 8, wherein the change is made by an update operation, or a deletion of the value of the first attribute type followed by an insertion of the new value of the first attribute type.

10. The computing system of claim 1, wherein the first object is a table.

11. The computing system of claim 1, wherein the first object is a view.

12. The computing system of claim 1, the operations further comprising:
   receiving an object definition statement defining the switch object as of the switch object type.

13. The computing system of claim 1, wherein the query optimizer does not read content of objects specified in the query that are not of the switch object type.

14. The computing system of claim 1, the operations further comprising:
   unfolding contents of the switch object using the values in the switch object for the first attribute type in response to the pruning to provide at least one physical object.

15. The computing system of claim 14, wherein the switch object type is a pure logical compile-time object.

16. The computing system of claim 15, wherein the switch object is accessible to a query optimizer but is not accessible to a query executor in executing the query.

17. A method, implemented in a computing system comprising at least one hardware processor and at least one memory coupled to the at least one hardware processor, the method comprising:
   receiving a database operation to insert one or more values for a first attribute type into a switch object;
   receiving a query that recites operations using a first object, a second object, and the switch object;
   processing the query with a query optimizer, the processing the query with the query optimizer comprising:
      determining that the query comprises a first join operation and a second join operation, wherein the first join operation references the switch object and a first object, and the second join operation references the switch object and a second object;
      retrieving values stored in the switch object for a first attribute type;
      determining that the first object comprises values for a second attribute type that match at least one value of the first attribute type for the switch object, wherein the first attribute type and the second attribute type correspond to a condition of the first join operation;
      determining that the second object does not comprise values for a third attribute type that match at least one value of the first attribute type for the switch object, wherein the first attribute type and the third attribute type correspond to a condition of the second join operation; and
      pruning the second join operation from a search space considered by the query optimizer.

18. The method of claim 17, wherein the switch object comprises a fourth attribute type, the method further comprising:
   comparing one or more values specified in the query with values for the fourth attribute type in the switch object; and
   defining a first select operation for a first value for the fourth attribute type in the switch object;
   defining a second select operation for a second value for the fourth attribute type in the switch object;
   determining that the second value is not comprised with the one or more values specified in the query;
   pruning the second select operation; and
   retrieving from the first object values for one or more additional attributes of the first object for records having the first value of the fourth attribute type for an attribute of the first object.

19. One or more non-transitory computer-readable storage media comprising:
   computer-executable instructions that, when executed by a computing system comprising at least one hardware processor and at least one memory coupled to the at least one hardware processor, cause the computing system to receive a query that recites operations using a switch object;
   computer-executable instructions that, when executed by the computing system, cause the computing system to process the query with a query optimizer, the processing the query with the query optimizer comprising:
      computer-executable instructions that, when executed by the computing system, cause the computing system to determine that the query comprises a first join operation and a second join operation, wherein the first join operation references a switch object and a first object, and the second join operation references the switch object and a second object;
      computer-executable instructions that, when executed by the computing system, cause the computing system to, retrieve values stored in the switch object for a first attribute type;
      computer-executable instructions that, when executed by the computing system, cause the computing system to determine that the first object comprises values for a second attribute type that match at least one value of the first attribute type for the switch object, wherein the first attribute type and the second attribute type correspond to a condition of the first join operation;
      computer-executable instructions that, when executed by the computing system, cause the computing system to determine that the second object does not comprise values for a third attribute type that match at least one value of the first attribute type for the switch object, wherein the first attribute type and the third attribute type correspond to a condition of the second join operation; and computer-executable instructions that, when executed by the computing system, cause the computing system to prune the second join operation from a search space considered by the query optimizer.

20. The one or more non-transitory computer-readable storage media of claim 19, wherein the switch object comprises a fourth attribute type, the one or more non-transitory computer-readable storage media further comprising:

computer-executable instructions that, when executed by the computing system, cause the computing system to compare one or more values specified in the query with values for the fourth attribute type in the switch object; and computer-executable instructions that, when executed by the computing system, cause the computing system to define a first select operation for a first value for the second attribute type in the switch object;

computer-executable instructions that, when executed by the computing system, cause the computing system to define a second select operation for a second value for the fourth attribute type in the switch object;

computer-executable instructions that, when executed by the computing system, cause the computing system to determine that the second value is not comprised with the one or more values specified in the query;

computer-executable instructions that, when executed by the computing system, cause the computing system to prune the second select operation; and computer-executable instructions that, when executed by the computing system, cause the computing system to retrieve from the second data object values for one or more additional attributes of the first object for records having the first value of the fourth attribute type for an attribute of the first object.

* * * * *